(12) United States Patent
Su et al.

(10) Patent No.: US 8,788,203 B2
(45) Date of Patent: Jul. 22, 2014

(54) USER-DRIVEN NAVIGATION IN A MAP NAVIGATION TOOL

(75) Inventors: Chien-Wen Danny Su, Richmond Hill (CA); Aarti Bharathan, Sunnyvale, CA (US); Adrian Solis, Bellevue, WA (US); Jonathan Aroner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 14 days.

(21) Appl. No.: 13/308,261

(22) Filed: Nov. 30, 2011

(65) Prior Publication Data

US 2012/0303273 A1 Nov. 29, 2012

Related U.S. Application Data

(60) Provisional application No. 61/489,182, filed on May 23, 2011.

(51) Int. Cl.
*G01C 21/00* (2006.01)

(52) U.S. Cl.
USPC .................. 701/533; 340/995.15; 701/400

(58) Field of Classification Search
USPC ............. 701/533, 455, 201, 538, 212, 400; 340/995.15
See application file for complete search history.

(56) References Cited

U.S. PATENT DOCUMENTS

| | | | |
|---|---|---|---|
| 4,914,605 A * | 4/1990 | Loughmiller et al. | 345/649 |
| 5,467,444 A | 11/1995 | Kawamura et al. | |
| 5,508,930 A | 4/1996 | Smith, Jr. | |
| 5,555,354 A | 9/1996 | Strasnick et al. | |
| 5,802,492 A | 9/1998 | DeLorme et al. | |
| 6,321,158 B1 | 11/2001 | DeLorme et al. | |
| 6,334,087 B1 | 12/2001 | Nakano et al. | |
| 6,430,501 B1 | 8/2002 | Slominski | |
| 6,484,092 B2 | 11/2002 | Seibel | |
| 6,650,326 B1 | 11/2003 | Huber et al. | |
| 6,785,667 B2 | 8/2004 | Orbanes et al. | |

(Continued)

FOREIGN PATENT DOCUMENTS

| | | |
|---|---|---|
| EP | 1526502 A2 | 4/2005 |
| EP | 2068121 | 6/2009 |
| KR | 10-2000-0062510 | 10/2000 |

OTHER PUBLICATIONS

Dorn et al., "Designing a User Interface for a PDA-Based Campus Navigation Device," *Proc. of the Human Factors and Ergonomics Society*, pp. 861-865 (Sep. 2004).

(Continued)

*Primary Examiner* — Helal A Algahaim
*Assistant Examiner* — Shardul Patel
(74) *Attorney, Agent, or Firm* — Sung Kim; Andrew Sanders; Micky Minhas

(57) ABSTRACT

A map navigation tool presents directions using a map navigation user interface that simplifies navigation in various ways. In particular, a user-driven navigation model simplifies user interaction with the map navigation tool. For example, the map navigation tool identifies an upcoming list item among multiple list items of a list of directions for a route. The map navigation tool receives a user input event. For example, the user input event represents a tap on a touchscreen of the computing device, voice input to a microphone of the computing device, or button or keystroke input to the computing device. Responsive to the user input event, the map navigation tool outputs an indication of the upcoming list item.

39 Claims, 20 Drawing Sheets

(56) References Cited

U.S. PATENT DOCUMENTS

| | | | |
|---|---|---|---|
| 6,826,472 B1 | 11/2004 | Kamei et al. | |
| 6,865,480 B2 | 3/2005 | Wong | |
| 6,956,590 B1 | 10/2005 | Barton et al. | |
| 6,972,757 B2 | 12/2005 | Arikawa et al. | |
| 7,239,959 B2 | 7/2007 | Rasmussen et al. | |
| 7,336,274 B2 | 2/2008 | Kida | |
| 7,353,114 B1 | 4/2008 | Rohlf et al. | |
| 7,430,473 B2* | 9/2008 | Foo et al. | 701/455 |
| 7,737,951 B2* | 6/2010 | Pinkus et al. | 345/173 |
| 7,788,028 B2* | 8/2010 | Matsuoka et al. | 701/425 |
| 7,796,139 B1 | 9/2010 | Feierbach et al. | |
| 7,920,963 B2 | 4/2011 | Jouline et al. | |
| 7,925,438 B2 | 4/2011 | Lo | |
| 7,933,929 B1* | 4/2011 | McClendon et al. | 707/802 |
| 8,306,749 B1* | 11/2012 | Petersen et al. | 701/527 |
| 8,319,772 B2 | 11/2012 | Fong et al. | |
| 8,583,374 B1 | 11/2013 | Petersen et al. | |
| 2002/0042674 A1 | 4/2002 | Mochizuki et al. | |
| 2003/0078729 A1 | 4/2003 | Ohdachi et al. | |
| 2003/0229441 A1 | 12/2003 | Pechatnikov et al. | |
| 2004/0024524 A1 | 2/2004 | Miyazawa | |
| 2004/0158393 A1 | 8/2004 | Oonishi et al. | |
| 2005/0083325 A1 | 4/2005 | Cho | |
| 2005/0140676 A1 | 6/2005 | Cho | |
| 2006/0174209 A1 | 8/2006 | Barros | |
| 2007/0096945 A1 | 5/2007 | Rasmussen et al. | |
| 2007/0132767 A1 | 6/2007 | Wright et al. | |
| 2007/0176796 A1 | 8/2007 | Bliss et al. | |
| 2007/0229538 A1 | 10/2007 | Klassen et al. | |
| 2008/0040024 A1 | 2/2008 | De Silva | |
| 2008/0167811 A1* | 7/2008 | Geelen | 701/212 |
| 2008/0228386 A1* | 9/2008 | Geelen et al. | 701/201 |
| 2008/0243374 A1 | 10/2008 | Hatazawa | |
| 2009/0037094 A1 | 2/2009 | Schmidt | |
| 2009/0046093 A1 | 2/2009 | Kikuchi et al. | |
| 2009/0112462 A1 | 4/2009 | Lo | |
| 2009/0171559 A1 | 7/2009 | Lehtiniemi et al. | |
| 2009/0177383 A1 | 7/2009 | Tertoolen | |
| 2009/0227268 A1* | 9/2009 | Sorensson et al. | 455/456.2 |
| 2009/0234567 A1 | 9/2009 | Lee | |
| 2010/0035596 A1 | 2/2010 | Nachman et al. | |
| 2010/0110130 A1 | 5/2010 | Silverbrook | |
| 2010/0179005 A1 | 7/2010 | Meadows et al. | |
| 2010/0198497 A1* | 8/2010 | Okuno | 701/201 |
| 2011/0066364 A1 | 3/2011 | Hale | |
| 2011/0077851 A1 | 3/2011 | Ogawa et al. | |
| 2011/0184642 A1* | 7/2011 | Rotz et al. | 701/201 |
| 2011/0313662 A1* | 12/2011 | Huang et al. | 701/210 |
| 2012/0019513 A1 | 1/2012 | Fong et al. | |
| 2012/0150436 A1* | 6/2012 | Rossano et al. | 701/450 |
| 2013/0069941 A1 | 3/2013 | Augui et al. | |

OTHER PUBLICATIONS

Microsoft Corporation, "Accessing the Bing Maps REST Services Using PHP," 18 pages, MSDN Library ff817004 (printed Jul. 3, 2012).
Microsoft Corporation, "Accessing the Bing Maps SOAP Services Using PHP," 32 pages, MSDN Library ff714580 (printed Jul. 3, 2012).
Microsoft Corporation, "Accessing the Bing Spatial Data Services Using PHP," 10 pages, MSDN Library ff817006 (printed Jul. 3, 2012).
Microsoft Corporation, "Bing Maps AJAX Control Articles," 4 pages, MSDN Library cc879134 (printed Jul. 3, 2012).
Microsoft Corporation, "Bing Maps Articles," 5 pages, MSDN Library bb545001 (printed Jul. 3, 2012).
Microsoft Corporation, "Bing Maps SOAP Services Articles," 2 pages, MSDN Library cc879135 (printed Jul. 3, 2012).
Microsoft Corporation, "Bing Maps Tile System," 11 pages, MSDN Library bb259689 (printed Jul. 3, 2012).
Microsoft Corporation, "Bing Spatial Data Services," 3 pages, MSDN Library ff701734 (printed Jul. 3, 2012).
Microsoft Corporation, "Calculating a Route Using Bing Maps SOAP Services," 8 pages, MSDN Library ee681887 (printed Jul. 3, 2012).
Microsoft Corporation, "Developing a Mobile Application Using Bing Maps SOAP Services," 20 pages, MSDN Library dd483215 (printed Jul. 3, 2012).
Microsoft Corporation, "Integrating MapPoint Web Services with Bing Maps," 25 pages, MSDN Library cc316940 (printed Jul. 3, 2012).
Microsoft Corporation, "Parsing REST Services JSON Responses (C#)," 11 pages, MSDN Library hh674188 (printed Jul. 3, 2012).
Microsoft Corporation, "Parsing REST Services XML Responses (C#)," 8 pages, MSDN Library hh534080 (printed Jul. 3, 2012).
Microsoft Corporation, "Searching for Traffic Incidents Along a Route," 4 pages, MSDN Library hh779734 (printed Jul. 3, 2012).
Microsoft Corporation, "Show Spatial Data Search Results on a Map," 14 pages, MSDN Library hh305205 (printed Jul. 3, 2012).
Microsoft Corporation, "Understanding Scale and Resolution," 3 pages, MSDN Library aa940990 (printed Jul. 3, 2012).
Microsoft Corporation, "Working with 3D," 14 pages, MSDN Library cc451896 (printed Jul. 3, 2012).
Microsoft Corporation, "Working with Events," 9 pages, MSDN Library bb544998 (printed Jul. 3, 2012).
Microsoft Corporation, "Working with Shape Layers" 5 pages, MSDN Library bb545003 (printed Jul. 3, 2012).
Microsoft Corporation, "Working with Shapes," 11 pages, MSDN Library cc451896 (printed Jul. 3, 2012).
Asma Naz, "Three Dimensional Interactive Pictorial Maps," M.S. Thesis, 61 pp. (Dec. 2004).

* cited by examiner

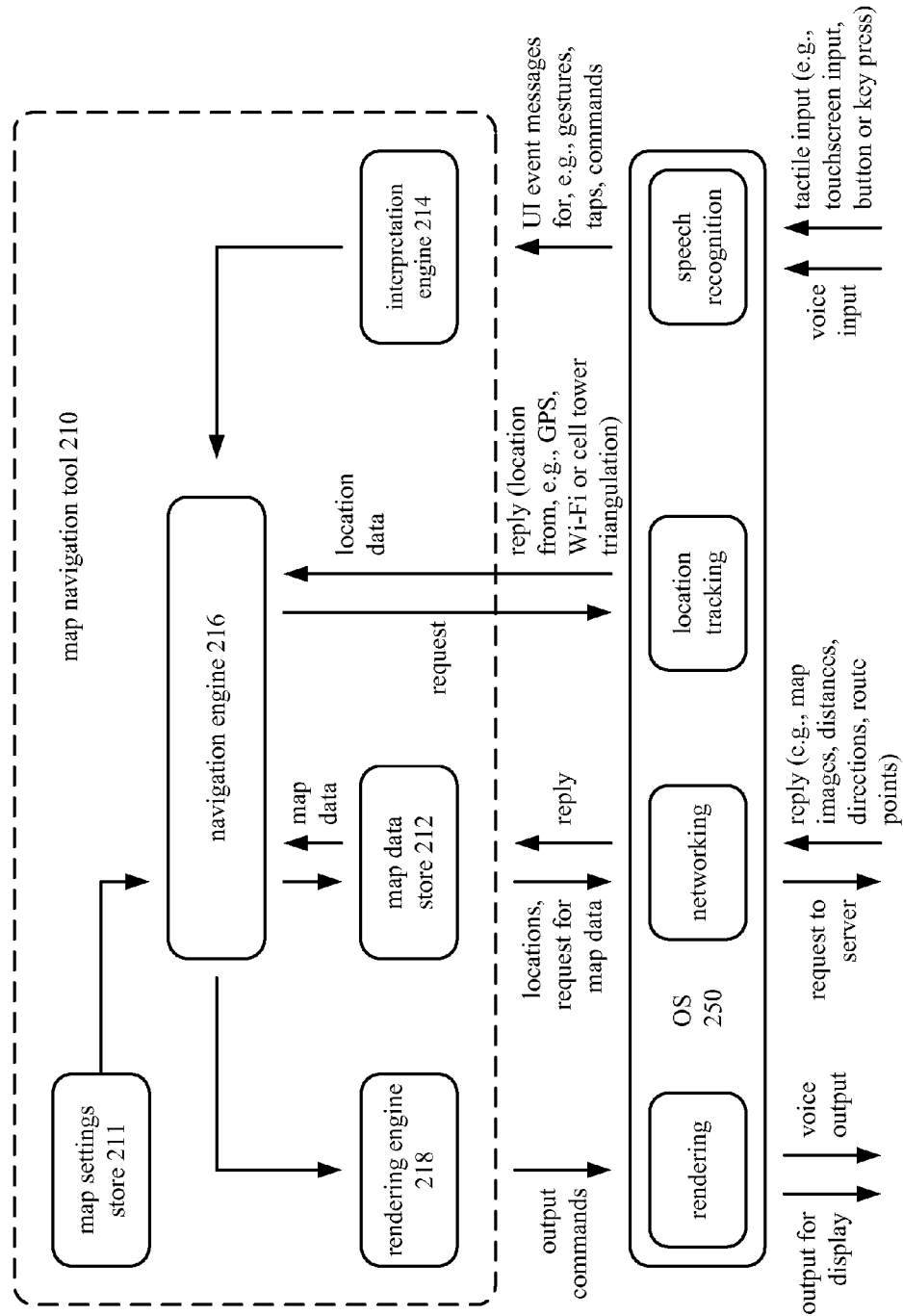

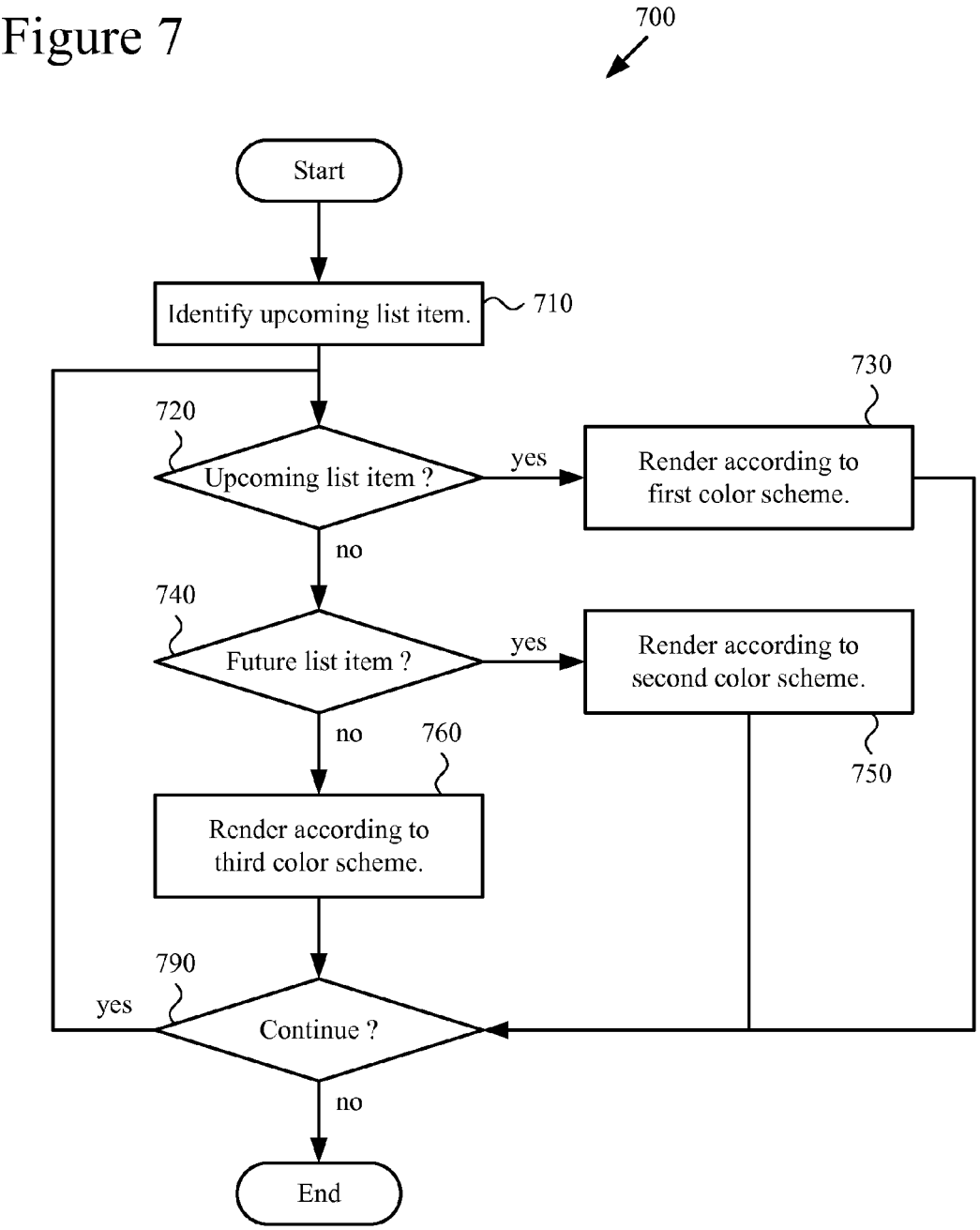

US 8,788,203 B2

USER-DRIVEN NAVIGATION IN A MAP NAVIGATION TOOL

CROSS REFERENCE TO RELATED APPLICATIONS

This application claims the benefit of U.S. Provisional Application No. 61/489,182, filed May 23, 2011, the disclosure of which is hereby incorporated by reference.

BACKGROUND

Computer-aided map navigation tools have achieved widespread acceptance. A user can find an address or directions with map navigation tools available at various Web sites. Some software programs allow a user to navigate over a map, zooming in towards the ground or zooming out away from the ground, or moving between different geographical positions. In cars, GPS devices have provided rudimentary road navigation for years. More recently, map navigation software for cellular telephones and other mobile computing devices has allowed users to zoom in, zoom out, and move around a map that shows details about geographical features, town, city, county and state locations, roads, and buildings.

With a turn-by-turn navigation system, a list of directions for a route is organized as multiple items corresponding to steps along the route. The multiple items are typically presented in order to a user as the user travels along the route. In some systems, the user can scroll through the list of directions to see locations along the route associated with different items, or select one of the multiple items to see the location that is associated with the item. Usually, the current location of the user is shown, and the user can be alerted of an upcoming instruction so long as the appropriate item in the list of directions is selected as the user approaches. While such systems work well in some scenarios, in other scenarios the presentation of directions can be overly complicated or difficult to control interactively.

SUMMARY

Innovations are described herein for presenting directions with a map navigation tool. These innovations simplify navigation in various ways. For example, a user-driven navigation model simplifies user interaction with the map navigation tool.

According to one aspect of the innovations described herein, a computing device implements a map navigation tool, and the map navigation tool identifies an upcoming list item among multiple list items of a list of directions for a route. The identification of the upcoming list item can be based at least in part on current location of the computing device. The map navigation tool receives a user input event. For example, the user input event represents a tap on a touchscreen of the computing device, voice input to a microphone of the computing device, or button or keystroke input to the computing device. Responsive to the user input event, the map navigation tool outputs an indication of the upcoming list item. For example, the output includes rendering for display a view of at least part of the list of directions and/or rendering for audio playback voice output for text description of the upcoming list item.

In some cases, for each of one or more subsequent user input events, the map navigation tool receives that subsequent user input event and, responsive to the subsequent user input event, outputs the indication of the upcoming list item, thereby repeating the output of the indication of the upcoming list item.

In other cases, based at least in part on a change to current location of the computing device, the map navigation tool changes the upcoming list item. When the map navigation tool then receives a subsequent user input event, the map navigation tool outputs an indication of the changed upcoming list item, thereby advancing in the order through the multiple list items. The map navigation tool can delay outputting the indication of the changed upcoming list item until receipt of a subsequent user input event.

When the map navigation tool renders for display a view of at least part of the list of directions, the map navigation tool can emphasize the upcoming list item in the view compared to other list items. For example, the upcoming list item is emphasized in the view by rendering a graphical icon and/or text for the upcoming list item in an accent color different than a default color used to render other list items. Or, as another example, the upcoming list item is emphasized in the view by aligning text for the upcoming list item at the top of a list control portion of the view.

When the map navigation tool renders for display a view of at least part of the list of direction, the map navigation tool can change that first view in response to a subsequent user input event. For example, the map navigation tool receives a subsequent user input event such as a flick gesture or pan gesture on a touchscreen of the computing device and, responsive to the subsequent user input event, renders for display a second view that is scrolled relative to the first view. The map navigation tool can identify a future list item among the multiple list items, then show the future list item in the second view by rendering a graphical icon and/or text for the future list item with a default color different than an accent color used to render a graphical icon and/or text for the upcoming list item. Or, the map navigation tool can identify a previous list item among the multiple list items, then de-emphasize the previous list item in the second view by rendering a graphical icon and/or text for the previous list item with lower intensity than the default color and the accent color.

The map navigation tool can also change the orientation of the view of a map depending on whether a current list item is the upcoming list item. For example, the map navigation tool checks whether the current list item is the upcoming list item. If the current list item is the upcoming list item, the map navigation tool sets the orientation of a view of a map so that heading toward an end location of the route is upward in the view of the map. Otherwise, if the current list item is not the upcoming list item, the map navigation tool sets the orientation of the view of the map so that north is upward in the view of the map.

These and other examples of innovative features are detailed below. The various innovative features described herein can be used in combination or separately. The foregoing and other objects, features, and advantages of the invention will become more apparent from the following detailed description, which proceeds with reference to the accompanying figures.

BRIEF DESCRIPTION OF THE DRAWINGS

FIG. 2 is a block diagram illustrating an example software architecture for a map navigation tool that renders map views and list views.

FIG. 7 is a flowchart illustrating a generalized technique for rendering list items with different color schemes in a map navigation tool.

DETAILED DESCRIPTION

Innovations are described herein for presenting directions with a map navigation tool. The various innovations described herein can be used in combination or separately.

Example Mobile Computing Device

Figure 1:
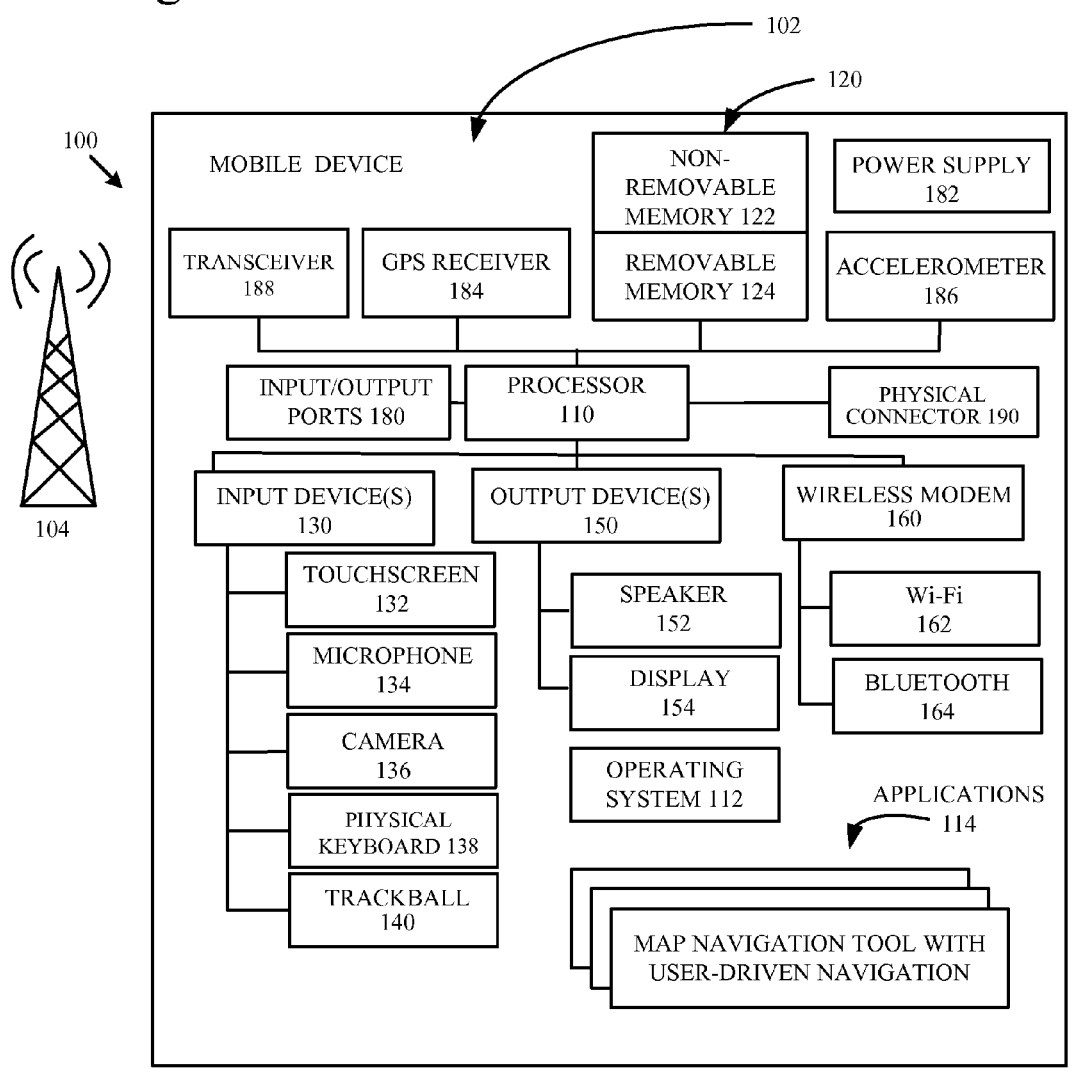
FIG. 1 is a block diagram illustrating an example mobile computing device in conjunction with which innovations described herein may be implemented.

FIG. 1 depicts a detailed example of a mobile computing device (100) capable of implementing the innovations described herein. The mobile device (100) includes a variety of optional hardware and software components, shown generally at (102). In general, a component (102) in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks (104), such as a Wi-Fi, cellular, or satellite network.

The illustrated mobile device (100) includes a controller or processor (110) (e.g., signal processor, microprocessor, ASIC, or other control and processing logic circuitry) for performing such tasks as signal coding, data processing, input/output processing, power control, and/or other functions. An operating system (112) controls the allocation and usage of the components (102) and support for one or more application programs (114) such as a map navigation tool that implements one or more of the innovative features described herein. In addition to map navigation software, the application programs can include common mobile computing applications (e.g., telephony applications, email applications, calendars, contact managers, web browsers, messaging applications), or any other computing application.

The illustrated mobile device (100) includes memory (120). Memory (120) can include non-removable memory (122) and/or removable memory (124). The non-removable memory (122) can include RAM, ROM, flash memory, a hard disk, or other well-known memory storage technologies. The removable memory (124) can include flash memory or a Subscriber Identity Module (SIM) card, which is well known in Global System for Mobile Communications (GSM) communication systems, or other well-known memory storage technologies, such as "smart cards." The memory (120) can be used for storing data and/or code for running the operating system (112) and the applications (114). Example data can include web pages, text, images, sound files, video data, or other data sets to be sent to and/or received from one or more network servers or other devices via one or more wired or wireless networks. The memory (120) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (100) can support one or more input devices (130), such as a touch screen (132) (e.g., capable of capturing finger tap inputs, finger gesture inputs, or keystroke inputs for a virtual keyboard or keypad), microphone (134) (e.g., capable of capturing voice input), camera (136) (e.g., capable of capturing still pictures and/or video images), physical keyboard (138), buttons and/or trackball (140) and one or more output devices (150), such as a speaker (152) and a display (154). Other possible output devices (not shown) can include piezoelectric or other haptic output devices. Some devices can serve more than one input/output function. For example, touchscreen (132) and display (154) can be combined in a single input/output device.

The mobile device (100) can provide one or more natural user interfaces (NUIs). For example, the operating system (112) or applications (114) can comprise speech-recognition software as part of a voice user interface that allows a user to operate the device (100) via voice commands. For example, a user's voice commands can be used to provide input to a map navigation tool.

A wireless modem (160) can be coupled to one or more antennas (not shown) and can support two-way communications between the processor (110) and external devices, as is well understood in the art. The modem (160) is shown generically and can include, for example, a cellular modem for communicating at long range with the mobile communication network (104), a Bluetooth-compatible modem (164), or a Wi-Fi-compatible modem (162) for communicating at short range with an external Bluetooth-equipped device or a local wireless data network or router. The wireless modem (160) is typically configured for communication with one or more cellular networks, such as a GSM network for data and voice communications within a single cellular network, between cellular networks, or between the mobile device and a public switched telephone network (PSTN).

The mobile device can further include at least one input/output port (180), a power supply (182), a satellite navigation system receiver (184), such as a Global Positioning System (GPS) receiver, sensors (186) such as an accelerometer, a gyroscope, or an infrared proximity sensor for detecting the orientation and motion of device (100), and for receiving gesture commands as input, a transceiver (188) (for wirelessly transmitting analog or digital signals) and/or a physical connector (190), which can be a USB port, IEEE 1394 (FireWire) port, and/or RS-232 port. The illustrated components (102) are not required or all-inclusive, as any of the components shown can be deleted and other components can be added.

The mobile device can determine location data that indicates the location of the mobile device based upon information received through the satellite navigation system receiver (184) (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to map navigation tool for use in map navigation. For example, the map navigation tool periodically requests, or polls for, current location data through an interface exposed by the operating system (112) (which in turn may get updated location data from another component of the mobile device), or the operating system (112) pushes updated location data through a callback mechanism to any application (such as the map navigation tool) that has registered for such updates.

With the map navigation tool and/or other software or hardware components, the mobile device (100) implements the technologies described herein. For example, the processor (110) can update a map view and/or list view in reaction to user input and/or changes to the current location of the mobile device. As a client computing device, the mobile device (100) can send requests to a server computing device, and receive map images, distances, directions, other map data, search results or other data in return from the server computing device.

The mobile device (100) can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 1 illustrates a mobile device (100), more generally, the innovations described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the map navigation innovations described herein can be implemented with any of the connected devices as a client computing device. Similarly, any of various computing devices in the cloud or a service provider can perform the role of server computing device and deliver map data or other data to the connected devices.

Example Software Architecture for Rendering of Map Data and Directions

FIG. 2 shows an example software architecture (200) for a map navigation tool (210) that renders views of a map depending on user input and location data. A client computing device (e.g., smart phone or other mobile computing device) can execute software organized according to the architecture (200) to render map views, list views of directions for a route, or other views.

The architecture (200) includes a device operating system (OS) (250) and map navigation tool (210). In FIG. 2, the device OS (250) includes components for rendering (e.g., rendering visual output to a display, generating voice output for a speaker), components for networking, components for location tracking, and components for speech recognition. The device OS (250) manages user input functions, output functions, storage access functions, network communication functions, and other functions for the device. The device OS (250) provides access to such functions to the map navigation tool (210).

A user can generate user input that affects map navigation. The user input can be tactile input such as touchscreen input, button presses or key presses or voice input. The device OS (250) includes functionality for recognizing taps, finger gestures, etc. to a touchscreen from tactile input, recognizing commands from voice input, button input or key press input, and creating messages that can be used by map navigation tool (210) or other software. The interpretation engine (214) of the map navigation tool (210) listens for user input event messages from the device OS (250). The UI event messages can indicate a panning gesture, flicking gesture, dragging gesture, or other gesture on a touchscreen of the device, a tap on the touchscreen, keystroke input, or other UI event (e.g., from voice input, directional buttons, trackball input). If appropriate, the interpretation engine (214) can translate the UI event messages from the OS (250) into map navigation messages sent to a navigation engine (216) of the map navigation tool (210).

The navigation engine (216) considers a current view position (possibly provided as a saved or last view position from the map settings store (211)), any messages from the interpretation engine (214) that indicate a desired change in view position, map data and location data. From this information, the navigation engine (216) determines a view position and provides the view position as well as location data and map data in the vicinity of the view position to the rendering engine (218). The location data can indicate a current location (of the computing device with the map navigation tool (210)) that aligns with the view position, or the view position can be offset from the current location.

The navigation engine (216) gets current location data for the computing device from the operating system (250), which gets the current location data from a local component of the computing device. For example, the location data can be determined based upon data from a global positioning system (GPS), by triangulation between towers of a cellular network, by reference to physical locations of Wi-Fi routers in the vicinity, or by another mechanism.

The navigation engine (216) gets map data for a map from a map data store (212). In general, the map data can be photographic image data or graphical data (for boundaries, roads, etc.) at various levels of detail, ranging from high-level depiction of states and cites, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Aside from names, the map data can include distances between features, route points (in terms of latitude and longitude) that define a route between start and end locations, text directions for decisions at waypoints along the route (e.g., turn at NE 148$^{th}$), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging).

Links can be provided for Web pages, to launch a Web browser and navigate to information about the feature.

The organization of the map data depends on implementation. For example, in some implementations, different types of map data (photographic image data or graphical surface layer data, text labels, icons, etc.) are combined into a single layer of map data at a given level of detail. Up to a certain point, if the user zooms in (or zooms out), a tile of the map data at the given level of detail is simply stretched (or shrunk). If the user further zooms in (or zooms out), the tile of map data at the given level of detail is replaced with one or more other tiles at a higher (or lower) level of detail. In other implementations, different types of map data are organized in different overlays that are composited during rendering, but zooming in and out are generally handled in the same way, with overlapping layers stretched (or shrunk) to some degree, and then replaced with tiles at other layers.

The map data store (212) caches recently used map data. As needed, the map data store (212) gets additional or updated map data from local file storage or from network resources. The device OS (250) mediates access to the storage and network resources. The map data store (212) requests map data from storage or a network resource through the device OS (250), which processes the request, as necessary requests map data from a server and receives a reply, and provides the requested map data to the map data store (212).

For example, to determine directions for a route, the map navigation tool (210) provides a start location (typically, the current location of the computing device with the map navigation tool (210)) and an end location for a destination (e.g., an address or other specific location) as part of a request for map data to the OS (250). The device OS (250) conveys the request to one or more servers, which provide surface layer data, route points that define a route, text directions for decisions at waypoints along the route, distances between waypoints along the route, and/or other map data in reply. The device OS (250) in turn conveys the map data to the map navigation tool (210).

As another example, as a user travels along a route, the map navigation tool (210) gets additional map data from the map data store (212) for rendering. The map data store (212) may cache detailed map data for the vicinity of the current location, using such cached data to incrementally change the rendered views. The map navigation tool (210) can pre-fetch map data along the route, or part of the route. Thus, as the rendered map views are updated to account for changes to the current location, the map navigation tool (210) often updates the display without the delay of requesting/receiving new map data from a server. As needed, the map data store (212) requests additional map data to render views.

The rendering engine (218) processes the view position, location data and map data, and renders a view of the map. Depending on the use scenario, the rendering engine (218) can render map data from local storage, map data from a network server, or a combination of map data from local storage and map data from a network server. In general, the rendering engine (218) provides output commands for the rendered view to the device OS (250) for output on a display. The rendering engine (218) can also provide output commands to the device OS (250) for voice output over a speaker or headphones.

The exact operations performed as part of the rendering depend on implementation. In some implementations, for map rendering, the tool determines a field of view and identifies features of the map that are in the field of view. Then, for those features, the tool selects map data elements. This may include any and all of the map data elements for the identified features that are potentially visible in the field of view. Or, it may include a subset of those potentially visible map data elements which are relevant to the navigation scenario (e.g., directions, traffic). For a given route, the rendering engine (218) graphically connects route points along the route (e.g., with a highlighted color) to show the route and graphically indicates waypoints along the route. The tool composites the selected map data elements that are visible (e.g., not obscured by another feature or label) from the view position. Alternatively, the tool implements the rendering using acts in a different order, using additional acts, or using different acts.

In terms of overall behavior, the map navigation tool can react to changes in the location of the computing device and can also react to user input that indicates a change in view position, a change in the top item in a list of directions for a route, or other change. For example, in response to a finger gesture or button input that indicates a panning instruction on the map, or upon a change to a previous item or next item in a list of directions for a route, the map navigation tool can update the map with a simple, smooth animation that translates (shifts vertically and/or horizontally) the map. Similarly, as the location of the computing device changes, the map navigation tool can automatically update the map with a simple translation animation. (Or, the map navigation tool can automatically re-position and re-render an icon that indicates the location of the computing device as the location is updated.) If the change in location or view position is too large to be rendered effectively using a simple, smooth translation animation, the map navigation tool can dynamically zoom out from at first geographic position, shift vertically and/or horizontally to a second geographic position, then zoom in at the second geographic position. Such a dynamic zoom operation can happen, for example, when a phone is powered off then powered on at a new location, when the view position is re-centered to the current location of the device from far away, when the user quickly scrolls through items in a list of directions for a route, or when the user scrolls to a previous item or next item in the list of directions that is associated with a waypoint far from the current view position. The map navigation tool can also react to a change in the type of view (e.g., to switch from a map view to a list view, or vice versa) or a change in details to be rendered (e.g., to show or hide traffic details).

Alternatively, the map navigation tool (210) includes more or fewer modules. A given module can be split into multiple modules, or different modules can be combined into a single module. For example, the navigation engine can be split into multiple modules that control different aspects of navigation, or the navigation engine can be combined with the interpretation engine and/or the rendering engine. Functionality described with reference to one module (e.g., rendering functionality) can in some cases be implemented as part of another module.

Example Map Navigation UI and Screenshots

Figure 3A:
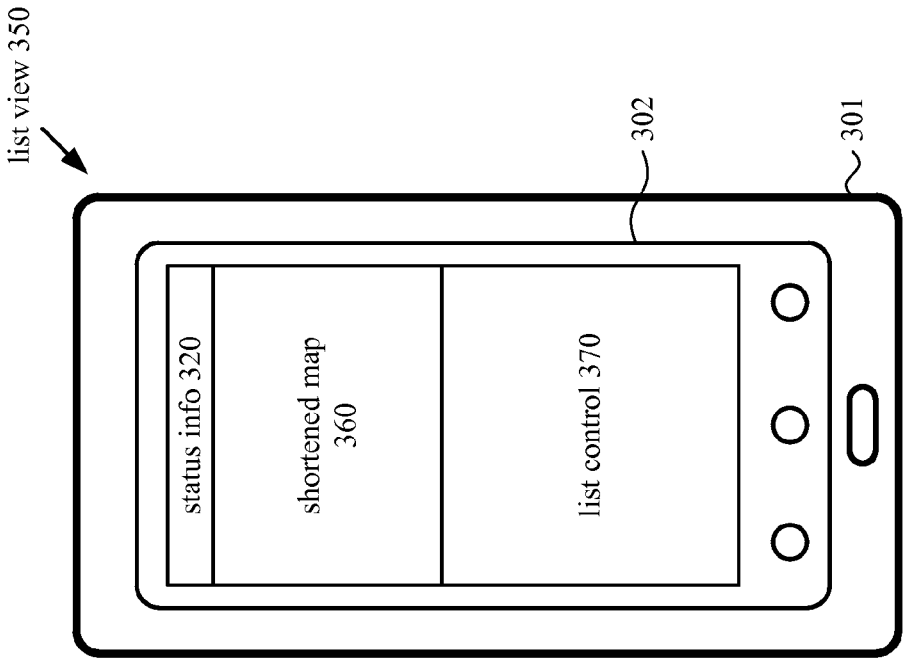
FIGS. 3a and 3b are diagrams illustrating features of a generalized map view and generalized list view rendered using a map navigation tool.
Figure 3B:
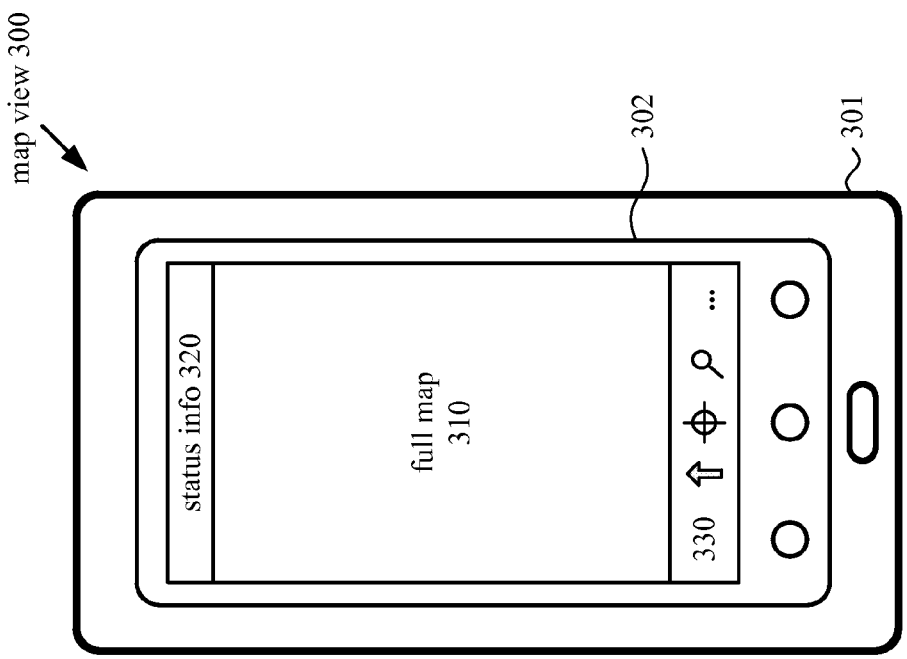
Figure 4A:
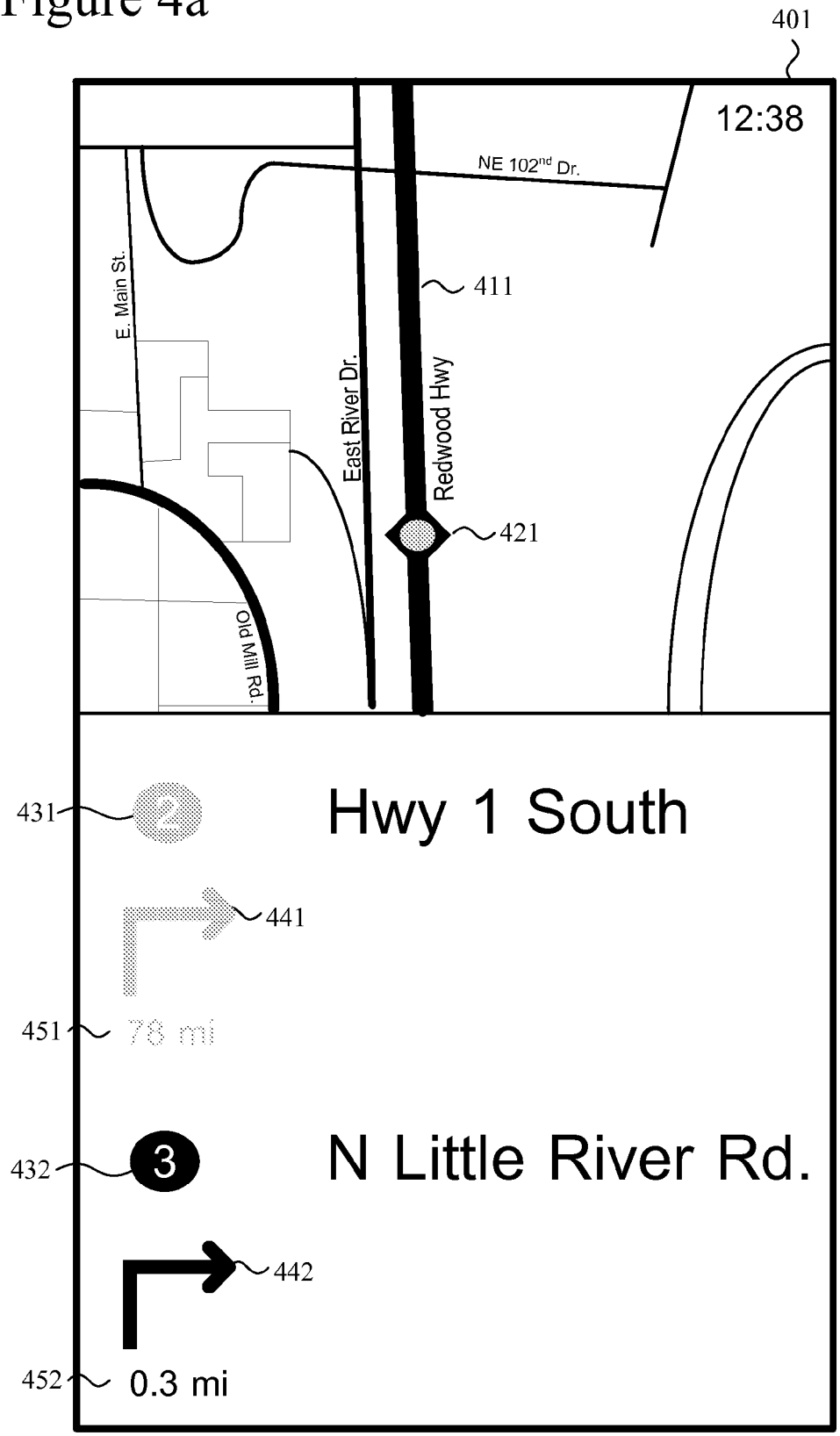
FIGS. 4a-4c are diagrams illustrating example user interface features of list views rendered using a map navigation tool.
Figure 4B:
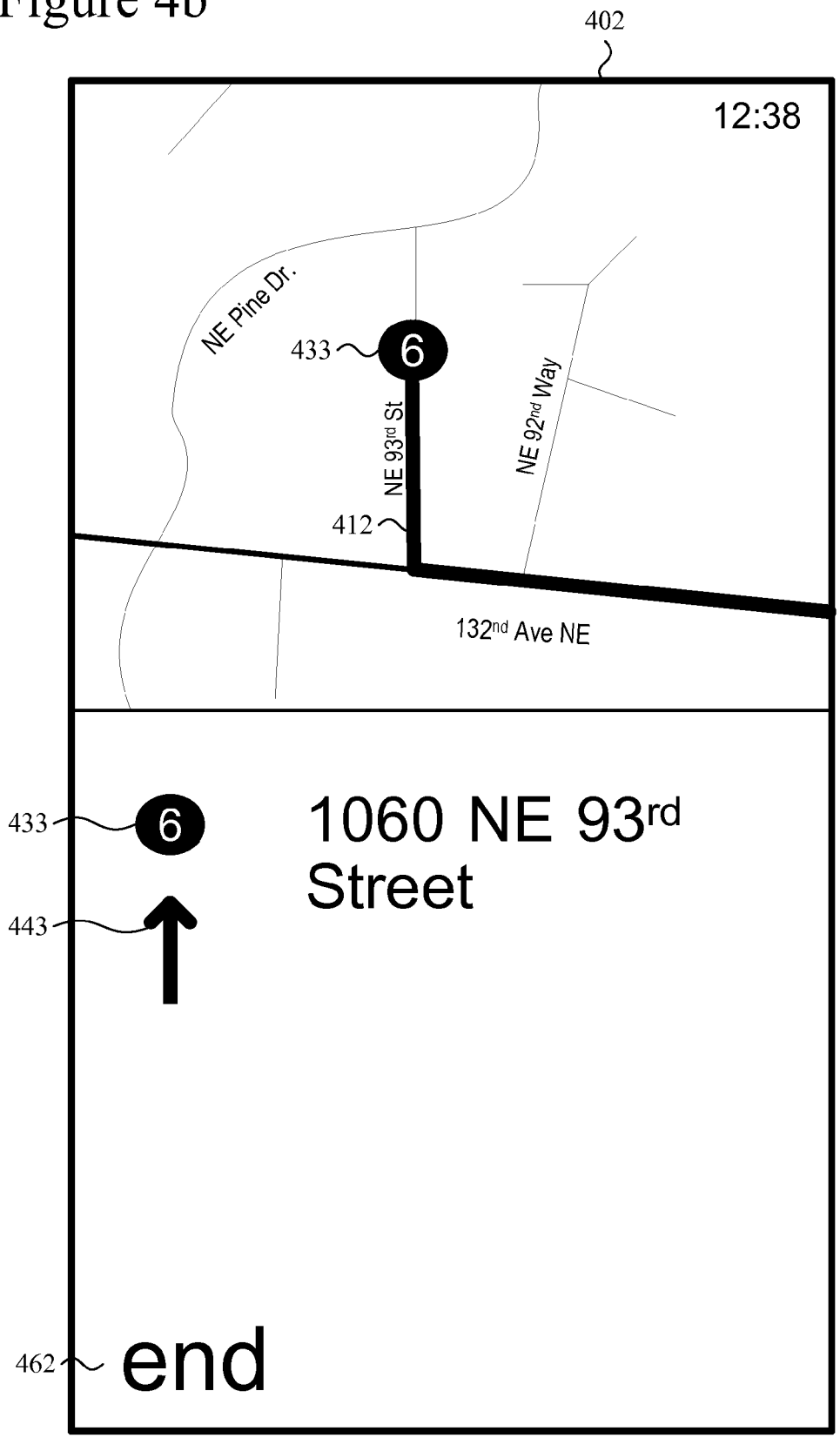
Figure 4C:

FIGS. 3a and 3b illustrate a generalized map view (300) and generalized direction list view (350), respectively, rendered using a map navigation tool of a mobile computing device (301). FIGS. 4a-4c are diagrams showing example screenshots (401, 402, 403) of a list view of a map navigation UI.

The device (301) includes one or more device buttons. FIGS. 3a and 3b show a single device button near the bottom of the device (301). The effect of actuating the device button depends on context. For example, actuation of the device button causes the device (301) to return to a home screen or start screen from the map navigation tool. Alternatively, the device (301) includes no device buttons.

The device (301) of FIGS. 3a and 3b includes a touchscreen (302) with a display area and three touchscreen buttons. The effect of actuating one of the touchscreen buttons depends on context and which button is actuated. For example, one of the touchscreen buttons is a search button, and actuation of the search button causes the device (301) to start a Web browser at a search page, start a search menu for contacts or start another search menu, depending on the point at which the search button is actuated. Or, one of the touchscreen buttons is a "back" button that can be used to navigate the user interface of the device. Alternatively, the device includes more touchscreen buttons, fewer touchscreen buttons or no touchscreen buttons. The functionality implemented with a physical device button can be implemented instead with a touchscreen button, or vice versa.

In the display area of the touchscreen (302), the device (301) renders views. In FIG. 3a, as part of the map view (300), the device (301) renders a full map (310) and status information (320) that overlays the top of the full map (310). The status information (320) can include time, date, network connection status and/or other information. The device (301) also renders a control section (330) that includes map navigation buttons, which depend on implementation of the map navigation tool. FIG. 3a shows a "directions" button (arrow icon), "re-center" button (crosshairs icon) and "search" button (magnifying glass icon). Actuation of the "directions" button causes the device (301) to open a menu for keystroke input for a destination location. Actuation of the "center" button causes the device (301) to align the view position over the current location of the device (301). Actuation of the "search" button causes the device (301) to open a menu for keystroke input for a search for a location or locations. Other buttons/controls can be accessed by actuating the ellipses, such as buttons/controls to clear the map of extra data, show/hide photographic image details, show/hide traffic data, show/hide route directions, change settings of the map navigation tool such as whether voice instructions are input or whether orientation of the view changes during progress along the route, etc. Alternatively, the device includes more map navigation buttons, fewer map navigation buttons or no map navigation buttons.

In FIG. 3b, as part of the list view (350), the device (301) renders a shortened map (360), status information (320) that overlays the top of the shortened map (360), and a list control (370). The shortened map (360) shows map details as in the full map (310) but also shows graphical details of at least part of a route between a start location and end location. The list control (370) shows text details and icons for directions along the route. FIGS. 4a-4c show example screenshots (401, 402, 403) of list views, each including a shortened map (360) and list control (370) as well as status information (320) (namely, time) that overlays the shortened map (360).

The screenshots (401, 402, 403) in FIGS. 4a-4c show different list views for a route between a start location and end location. In the screenshot (401) of FIG. 4a, a graphical icon (421) shows the current location along the route in the map portion of the list view. Part of the route (411) is shown in a highlighted color relative to the rest of the map data. The list control of the screenshot (401) includes waypoint icons (431, 432) and text details for waypoints along the route. Items in the list of direction are organized as waypoints, which represent points at which the user is given specific directions to turn, continue straight, take an exit, etc. Below the waypoint icons (431, 432), direction icons (441, 442) graphically represent the active part of the directions, e.g., to turn continue straight, take an exit associated with the respective waypoints. Distance values (451, 452) indicate the distance between waypoints (as in the distance (452) between waypoints 2 and 3) or distance between the current location and the upcoming waypoint (as in the distance (451) to waypoint 2).

The color of the waypoint icons (431, 432), text details, direction icons (441, 442) and distance values (451, 452) can change depending on the status of progress along the route. In FIG. 4a, the waypoint icon (431), text and direction icon (441) for waypoint 2 are rendered in an accent color to indicate waypoint 2 is the upcoming item in the list of directions. On the other hand, the waypoint icon (432), associated text and direction icon (442) for waypoint 3 are rendered in a neutral color to indicate waypoint 3 is further in the future.

The screenshot (402) of FIG. 4b shows the list view after the user scrolls to the end of the list of directions, which is graphically represented with text (462). Waypoint icons (433) represent a final waypoint in the map portion and list control of the list view. The map portion highlights part (412) of the route graphically. In the list control, the waypoint icon (433) is followed by text associated with the waypoint and a direction icon (443), but not a distance value since the waypoint is the final waypoint. The waypoint icon (433), associated text and direction icon (443) for the final, future waypoint are rendered in a neutral color.

The screenshot (403) of FIG. 4c shows the list view after the user scrolls back to the start of the list of directions, which is graphically represented with text (461). The map portion shows part (413) of the route graphically, but the completed part of the route is grayed out. Waypoint icons (434) represent an initial waypoint in the map portion and list control of the list view, and are also grayed out to show that the initial waypoint has been passed. Another waypoint icon (435) represents a subsequent waypoint. In the list control, space permitting, the waypoint icons (434, 435) are followed by text associated with the waypoints and direction icons (444), also grayed out, but not distance value since the waypoints have been passed. The list control also includes transit mode icons (472) that the user can actuate to switch between modes of transit (e.g., walking, car, bus).

Elements of List Control of Map Navigation UI

Figure 5A:
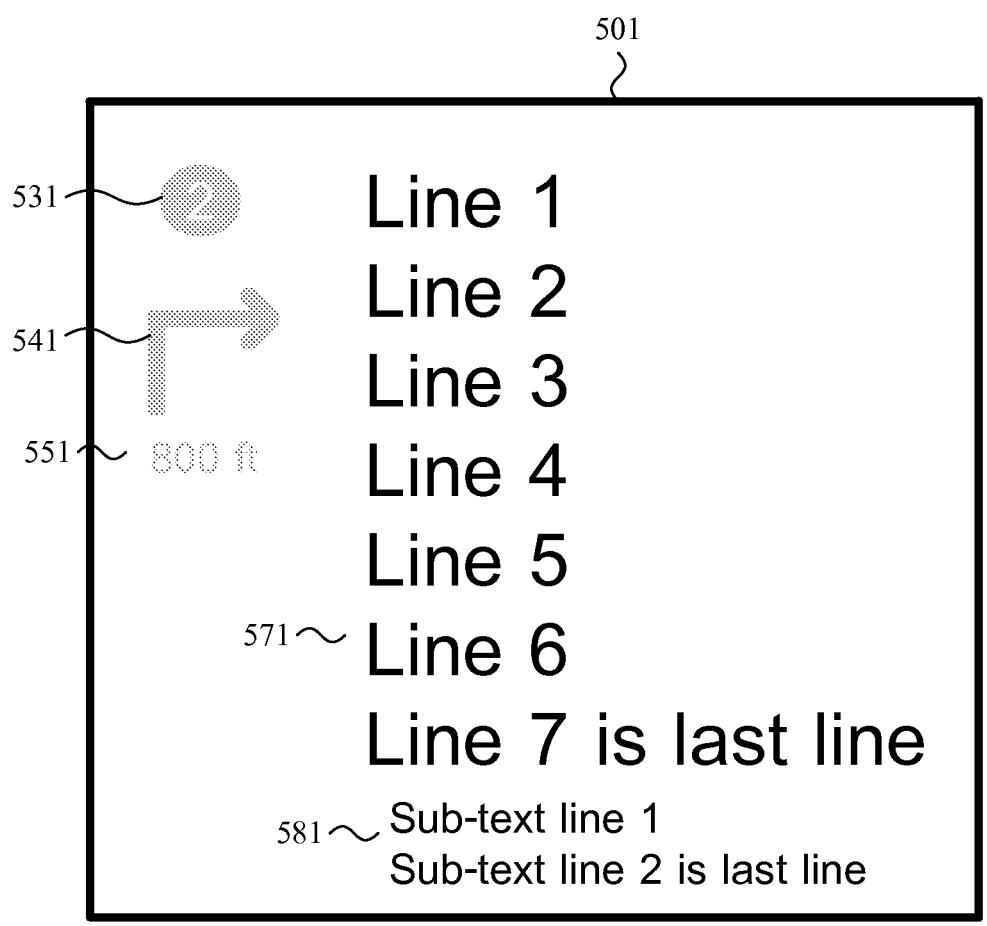
FIGS. 5a-5c are diagrams illustrating portions of example list views in a map navigation tool.
Figure 5B:
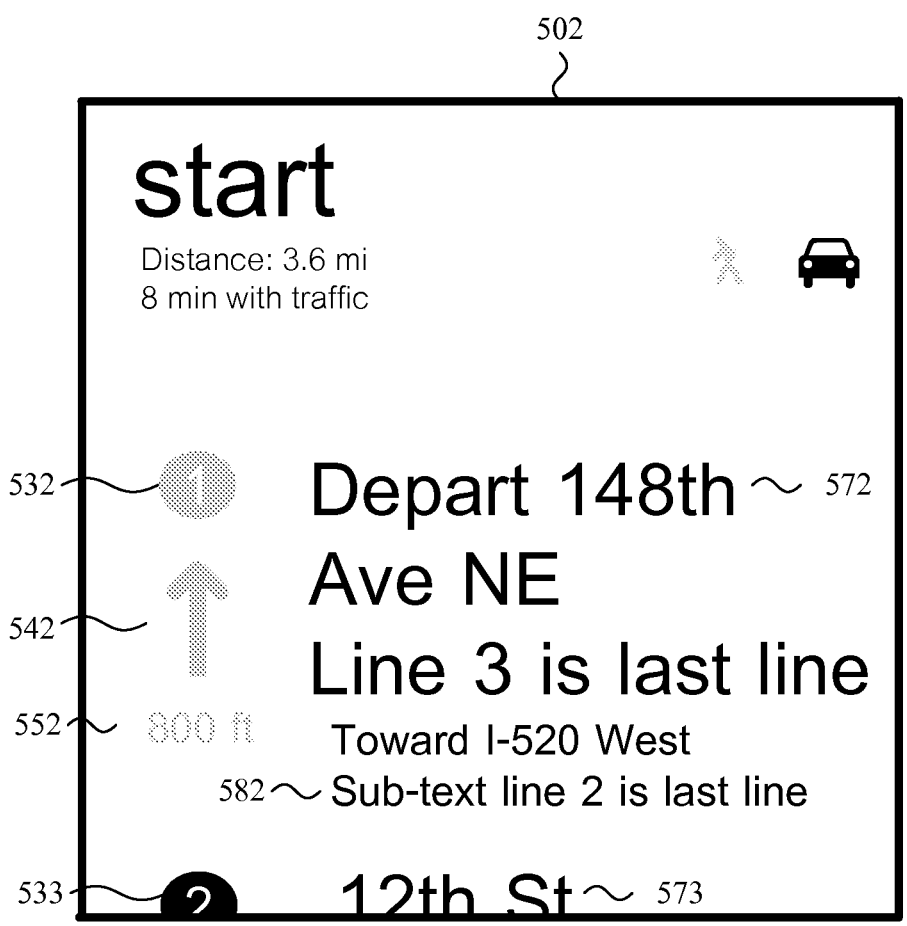
Figure 5C:
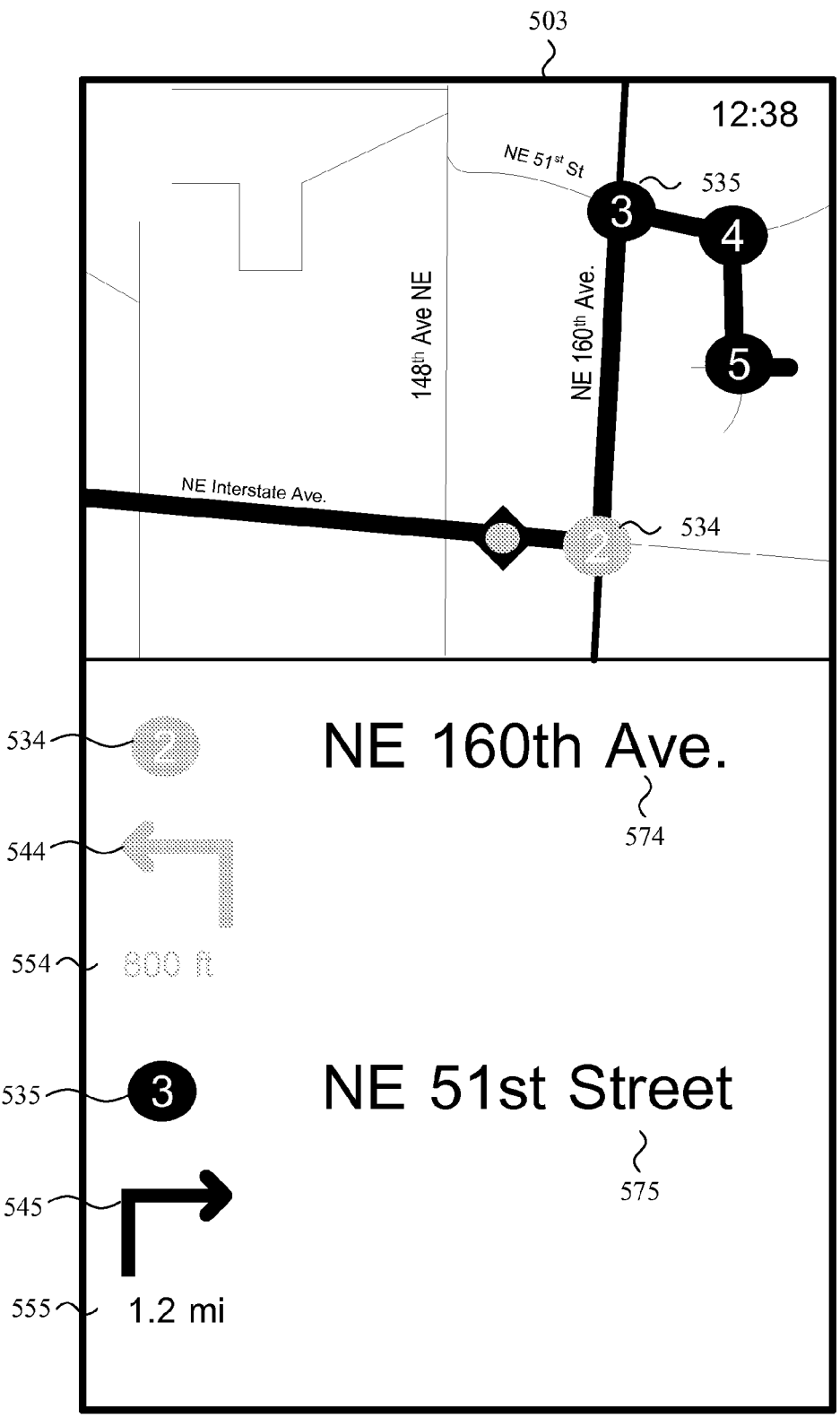

This section further describes example UI elements of a list control and example operations that a map navigation tool performs when presenting list views. In particular, FIGS. 5a-5c illustrate behaviors and UI elements of a list view of a map navigation UI. As in FIGS. 4a-4c, the list view includes a list control below a map portion, and the user can view upcoming, previous and future list items by scrolling through the list of directions. Depending on implementation, the map navigation tool can use text, graphical icons for directions, audio, a plotted map route, an icon for the current location, and/or waypoint icons to convey directions to the user. FIGS. 4a-4c and 5a-5c show different features of list views, but are not related as a series for the same list of directions.

The innovations described herein (including, but not limited to, the user-driven navigation model, dynamic adjustment of graphics/text for directions depending on current location, and use of a destination icon that directs the user towards the destination of a route) can be used with a map navigation UI as described with reference to FIGS. 3a, 3b, 4a-4c and 5a-5c, or they can be used with another map navigation UI. The map navigation tool can be any combination of software and/or hardware that implements a map navigation UI.

Obtaining List of Directions. In general, the map navigation tool obtains multiple list items of a list of directions for a route. Each of the multiple list items is associated with an action (e.g., depart, turn, go straight, arrive), location text and location (e.g., start location, end location, waypoint location). For example, the map navigation tool sends an end location of the route (such as a destination address) to a server. The map navigation tool receives direction information that includes descriptive text for the multiple list items. The direction information can also include distance information indicating distances between different locations for the respective list items along the route. The start location may be represented as an initial list item in the list of directions, or as a separate location. Similarly, the end location may be represented as a final list item in the list of directions, or as a separate location. The map navigation tool assembles the list of directions from the received direction information. Alternatively, the map navigation tool obtains the multiple list items of the list of directions in some other way.

Rendering Map Portion of List View. The map navigation tool renders for display a view of a map. For a given list item, the map navigation tool typically renders a waypoint icon at the location for the given list item, if the location is visible. The user can use pan gestures to move the map portion or zoom in/out with double tap, pinch, or spread gestures.

Orientation of Map Portion. The map navigation tool can set the orientation of a view of the map depending on whether a current list item is the upcoming list item. For example, the map navigation tool checks whether a current list item is the upcoming list item. If the current list item is the upcoming list item, the map navigation tool sets the orientation of the view of the map so that the heading to the end location of the route is upward in the view of the map. Otherwise (if the current list item is not the upcoming list item), the map navigation tool sets the orientation of the view of the map so that north is upward in the view of the map. Once set, the heading does not change even if the user changes the map portion with pan, double tap, pinch, or spread gestures. Alternatively, the orientation of the view of the map changes as the user navigates along the route.

Rendering List Control of List View. The map navigation tool also renders for display a view of at least part of the list of directions. For a given list item, the map navigation tool renders the waypoint icon for the given list item, the location text for the given list item, and a direction icon for the action for the given list item. The map navigation tool can also render sub-text for the given list item, which is typically de-emphasized compared to the location text for the given list item.

Main Text. As shown in FIGS. 5a-5c, main instruction text (571, 572, 573, 574, 575) is condensed. The main text (e.g., for the street at which a turn should be made, for the exit ramp that should be followed, for the final address of the destination) is concise, relatively larger than other text, and separated from text for other instructions. This de-clutters the list of instructions and makes the main instruction text "glanceable," or easy to perceive quickly.

Instruction text is cropped as needed to fit in the list control. The way instruction text is cropped can depend on whether the text is for an initial list item or later list item. For example, the map navigation tool crops main text after the first seven lines (see text (571) in FIG. 5a) except for the initial list item, in which case main text is cropped after the first three lines (see text (572) in FIG. 5b).

After a given list item, the next list item is displayed if space remains in the list control. In FIG. 5a, the list control (501) includes icons (531, 541) and text (571) for a single list item. In FIG. 5c, the list control portion of the list view (503) includes icons (534, 535, 544, 545) and text (574, 575) for multiple list items. The next list item can be partially displayed, as in the list control (502) of FIG. 5b, which partially shows an icon (533) and text (573) for the second list item. Instruction text for the initial list item of a list can be cropped (e.g., after three lines) such that the initial view of the list control includes at least part of the second list item, which provides a prompt to the user that instructions for future list items are below the fold.

In some cases, the map navigation tool consolidates text that is duplicative. For example, a list item can include an exit name for an exit from a highway as well as a street name for a street onto which the user should turn. If the exit name and street name are the same, the map navigation tool renders the name only once—showing the exit name and details, but omitting the street name to the extent it matches the exit name. More generally, the map navigation tool detects duplicate text and eliminates the duplicate text.

Sub-text. The list control (501) in FIG. 5a and list control (502) in FIG. 5b also include sub-text (581, 582), which indicates additional directions, commentary, hints about visual landmarks, or other information. The sub-text (581, 582) begins on a line after the main text (571, 572). In general, for an instruction aligned at the top of the list control portion of a list view, as shown in FIG. 5a, the map navigation tool crops the sub-text to fit in the view. The sub-text (581) for the instruction does not spill over to the next screen. For the initial list item of a list, as shown in FIG. 5b, the first line of sub-text (582) can indicate the road towards which the user should turn, and the sub-text (582) is cropped after two lines to make room for (at least part of) the next instruction.

Direction Icons. FIGS. 5a-5c show example direction icons (541, 542, 544, 545). The map navigation tool uses relatively large, prominent icons to represent actions for directions. A given direction icon indicates the main action for a list item. For example, the map navigation tool uses a large left arrow or large right arrow instead of the text "left" or "right." Direction icons can represent different gradations of left turn, different gradations of right turn, a straight course, U turn, combination turns (e.g., right turn then quick left turn), exit ramps, departure from the start location, arrival at the end location and/or other actions. The map navigation tool can receive direction icons for a route as part of the direction information from a server, or the map navigation tool can use default direction icons for actions. If a direction icon is not available, the map navigation tool can use text for an action.

Waypoint Icons. FIGS. 5a-5c also show example waypoint icons (531, 532, 533, 534, 535). A waypoint icon for a list item generally appears above, and has the same color as, the direction icon for that list item. A waypoint icon can be used for a waypoint location, the start location or the end location. The waypoint icon also appears at an appropriate location in the map portion of the list view, as shown in FIG. 5c.

Distance Values. Distance values (551, 552, 554, 555) are displayed under corresponding direction icons in the FIGS. 5a-5c. For the upcoming list item (compared to the current location of the computing device), the distance value represents the distance value between the current location and location for the upcoming list item. The distance value is updated so that it decreases as the user approaches the location for the upcoming list item. For a future list item, the distance value indicates the distance between locations for that future list item and the immediately preceding list item, respectively. For example, in FIG. 5c, 800 feet is the distance value (554) between the current location and location for upcoming list item 2. The distance value (554) will decrease as the user approaches the location. Once the current location crosses the location for list item 2, list item 3 is the upcoming list item, and the distance value (555) of 1.2 miles will decrease until the current location reaches the location for list item 3. The update rate for the distance value can depend on the rate at which the current location is updated (e.g., once per second). For example, the map navigation tool updates the distance value when it periodically polls the operating system for the current location.

Automatic Feedback. The map navigation tool can automatically (i.e., without user prompting) provide feedback in various ways. After the user successfully completes navigation for a list item, the map navigation tool can generate positive feedback (e.g., beep, ding or other tone) that the step was successfully performed. Or, if the user makes a wrong turn or otherwise deviates from the route, the map navigation tool can generate another noise, show an error screen and/or otherwise provide negative feedback. In general, the map navigation tool does not automatically initiate remediation to get the user back on course, but the map navigation tool can initiate such remediation (e.g., by re-calculating a new route) if the user prompts the map navigation tool to do so (e.g., by tapping the touchscreen of the computing device).

User-Driven Navigation

In conventional turn-by-turn navigation, a map navigation tool presents a list of directions for a route. Instructions are presented in order as a user travels along the route. Typically, the map navigation tool shows the current location of the computing device, and the user cannot look behind or ahead in the list of directions for the route. In addition, in many scenarios, the presentation of directions is too complicated or difficult to control. In particular, it can be difficult to control the list of directions and find an upcoming instruction when driving.

According to a first set of innovations described herein, a map navigation tool presents an upcoming instruction responsive to user input. For example, when a user taps a touchscreen of a computing device, provides a voice command such as "Next," or otherwise interacts with the device, the map navigation tools renders the upcoming instruction with emphasis on the display and/or announces the upcoming instruction over a speaker. In this way, the user gets visual and/or audio instructions from the map navigation tool when the user chooses to get such instructions. This user-driven navigation model simplifies user interaction with a map navigation tool.

Such user-driven alerts can provide several other advantages. The user can receive a particular instruction multiple times by repeatedly providing user input (tapping, etc.), which puts the user in control of when the upcoming instruction is output. This may help the user understand an instruction that is tricky or complicated, or help if the user misses the first alert for the instruction due to background noise or some other distraction. Also, the user can cause the map navigation tool to output the upcoming instruction well ahead of an upcoming turn, exit ramp, etc. to give the user time to change lanes or otherwise prepare to follow the instruction. In this way, the user can learn upcoming instructions by interacting with the computing device. On the other hand, if the user chooses not to provide additional user input, or if the user switches to another application, the map navigation tool does not continue to announce instructions along the route, which makes less noise for the user. Thus, if a driver knows a shortcut not reflected in the route, or seeks to avoid traffic on part of the route, the driver can take a different course without the map navigation tool distracting the driver with out-dated announcements about the route.

Figure 6A:
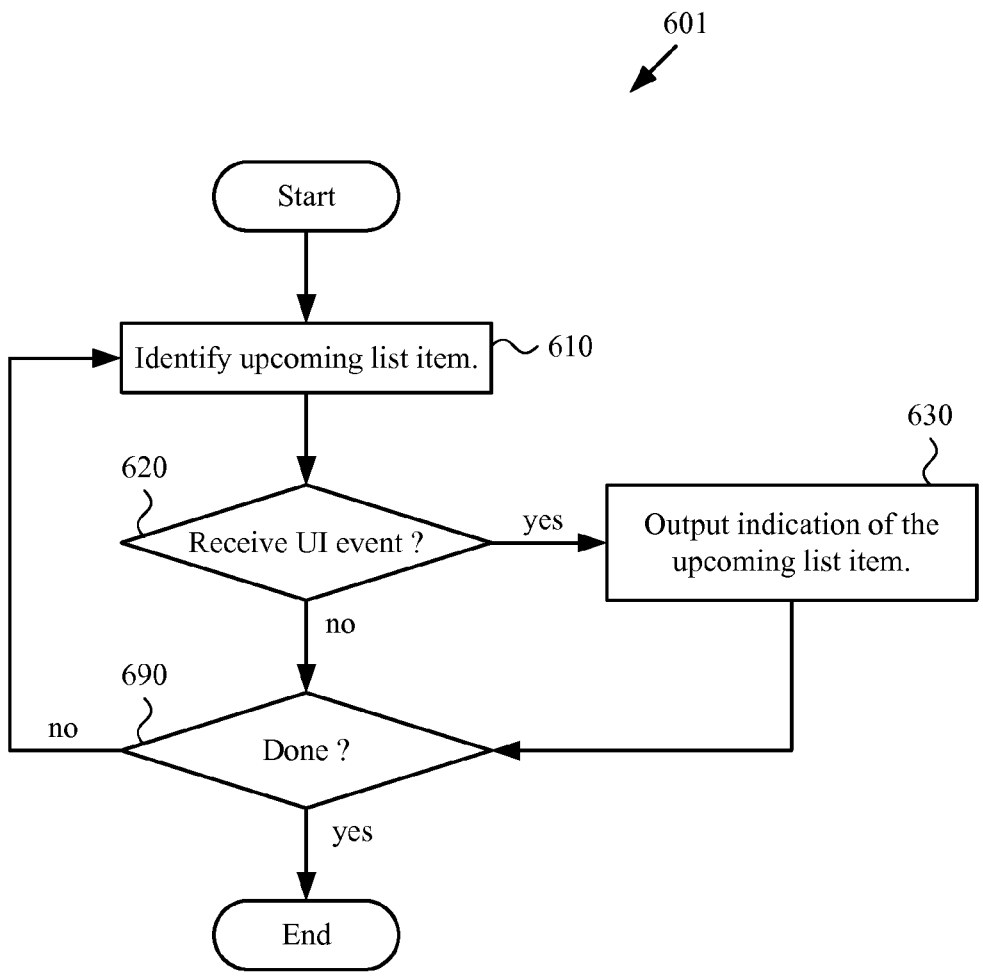
FIGS. 6a and 6b are flowcharts illustrating generalized techniques for user-driven navigation in a map navigation tool.
Figure 6B:
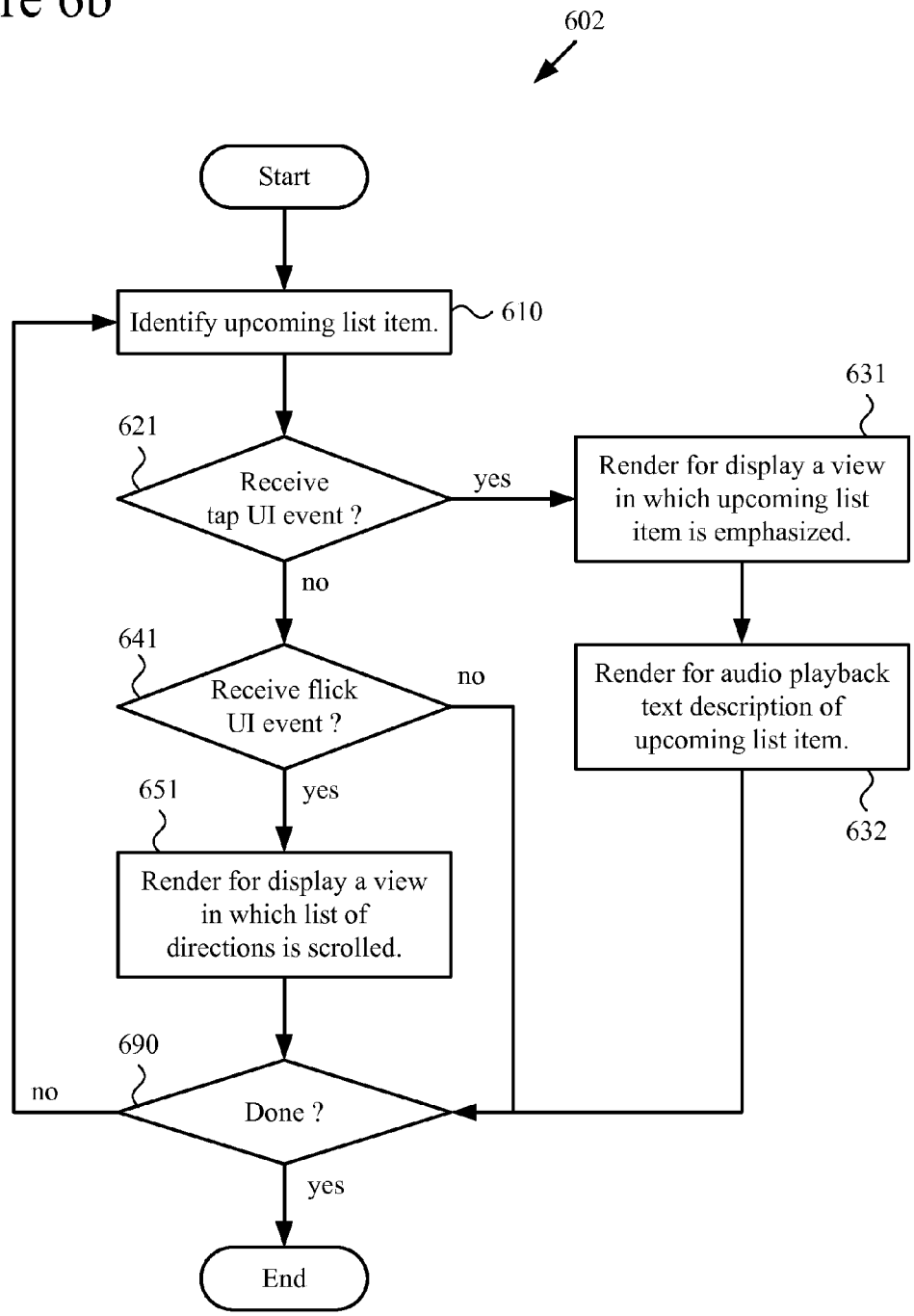

FIGS. 6a and 6b show generalized techniques (601, 602) for user-driven navigation in a map navigation tool. A computing device such as a mobile computing device can perform the technique (601) of FIG. 6a or technique (602) of FIG. 6b.

With reference to FIG. 6a, to start, the map navigation tool identifies (610) an upcoming list item among multiple list items of a list of directions for a route. The list of directions includes the multiple list items in order. Typically, the map navigation tool identifies the upcoming list item based at least in part of the current location of the computing device.

The map navigation tool checks (620) whether a user input event has been received. For example, the user input event can represent a tap on a touchscreen of the computing device, voice input to a microphone of the computing device, button or keystroke input to the computing device, or some other input to the computing device. In example implementations, the user input is a tap on a touchscreen, which provides a large touch target that simplifies interaction with the computing device when driving. The user input event can be any form of message, interrupt, call or other communication within the computing device.

If the map navigation tool has received a user input event, responsive to the user input event, the map navigation tool outputs (630) an indication of the upcoming list item. For example, the map navigation tool renders (for audio playback) voice output for text description of the upcoming list item and/or renders (for display) a view of at least part of the list of directions. In a view rendered for display, the upcoming list item can be emphasized in several ways compared to other list items of the multiple list items. The map navigation tool can render a graphical icon and/or text for the upcoming list item in an accent color different than a default color used to render other list items of the multiple list items. The map navigation tool can also align text for the upcoming list item at the top of the list control portion of the list view, which provides the effect of "snapping" the icons, text, etc. for the upcoming list item to a prominent position on the display. Alternatively, the map navigation tool outputs the indication of the upcoming list item in some other way.

The map navigation tool checks (690) whether to continue navigation and, if so, repeats the loop of identifying (610) the upcoming list item and checking (620) for user input events. With this model of interactive navigation, the map navigation tool can repeat the indication of the upcoming list item if the upcoming list item has not changed. For example, for each of one or more subsequent user input events, the map navigation tool receives the subsequent user input event and, responsive to the subsequent user input event, outputs the indication of the upcoming list item.

With this model of interactive navigation, as the upcoming list item changes, the map navigation tool can also advance in order through the multiple list items of the list of directions. For example, the map navigation tool changes the upcoming list item based at least in part on a change to current location of the computing device. Depending on the change in current location, the map navigation tool can advance through the list of directions by one list item or by multiple list items. Then, when the map navigation tool receives a subsequent user input event, responsive to the subsequent user input event, the map navigation tool outputs an indication of the changed upcoming list item. By delaying the output of the indication of the changed upcoming list item until receipt of a subsequent user input event, the map navigation tool can avoid distracting the user with instructions the user already knows.

FIG. 6b shows a variation (602) of the technique with different types of user input events and corresponding output details. After identifying (610) the upcoming list item, the map navigation tool checks (621) whether a "tap" user input event has been received. For example, the tap user event is a tap anywhere on a touchscreen of the computing device. If a tap user input event has been received, the map navigation tool renders (631) for display a view in which the upcoming list item is emphasized and renders (632) for audio playback text description of the upcoming list item. The map navigation tool can similarly render display and audio for the upcoming list item responsive to other user input events for user input such as a voice command, button input for a physical button or button input for a touchscreen button.

As part of the same event handling loop, the map navigation tool checks (641) whether a "flick" user input event has been received. If the map navigation tool has received a flick user input event as a subsequent user input event (after the upcoming list item has already been rendered for display), responsive to the subsequent user input event, the map navigation tool renders (651) for display a view in which the list of directions is scrolled relative to the earlier view. In the scrolled list of directions, when the map navigation tool identifies a future list item (following the upcoming list item in order), the map navigation tool can show the future list item by rendering a graphical icon and/or text for the future list item with a default color different than the accent color used for the upcoming list item. When the map navigation tool identifies a previous list item (preceding the upcoming list item in order), the map navigation tool can de-emphasize the previous list item by rendering a graphical icon and/or text for the previous list item with lower intensity than the default color and the accent color. The map navigation tool can similarly scroll through the list of directions responsive to other user input events for user input such as a "pan" gesture, button input for a physical button (e.g., volume up/down control) or button input for a touchscreen button.

As in FIG. 6a, the map navigation tool checks (690) whether to continue navigation and, if so, repeats the loop of identifying (610) the upcoming list item and checking (621, 641) for user input events. With this model of interactive navigation, the map navigation tool can repeat an upcoming list item if the upcoming list item has not changed, advance in order through the multiple list items of the list of directions as upcoming list items, or review previous and/or future lists items.

For example, with reference to FIGS. 4a-4c and 5a-5c, the user-driven navigation reacts to different types of user input (e.g., tap, flick up gesture, flick down gesture, or pan gesture on a touchscreen) in different ways. FIGS. 4a-4c illustrate three different states of the list view: when the current list item is the upcoming list item on the route (FIG. 4a), when the current list item is a future list item on the route (FIG. 4b), and when the current list item is a previous list item on the route (FIG. 4c).

The list view (401) in FIG. 4a shows an upcoming list item (list item 2) at the top of the list control. The map navigation tool renders the list view (401) when the user taps on a touchscreen of the computing device. By providing a large tap target (e.g., anywhere on the touchscreen), the map navigation tool makes it easier to reach the list view (401). Alternatively, certain parts of the touchscreen are excluded (e.g., mode change icons or some other sections).

In particular, responsive to the tap gesture, the map navigation tool "snaps" the waypoint icon (431), main text detail "Hwy 1 South," direction icon (441), etc. for the upcoming list item to the top of the list control portion of the list view. In the map portion of the list view (401), the map navigation tool updates the display to show the current location icon (421) at the current location of the computing device. If close enough to the current location, the map navigation tool can also show the waypoint icon (431) for the upcoming list item in the map portion. Or, the map navigation tool can dynamically zoom to show both the current location icon (421) and waypoint icon (431) in the map portion. The map portion is oriented in the direction the user is traveling, with the map rotating so that the direction to the end location is up.

Responsive to the tap gesture, the map navigation tool can also take other actions. The map navigation tool can read out descriptive text for the upcoming list item. The map navigation tool can also read out a current distance value between the current location of the computing device and location for the upcoming list item. For example, if the upcoming turn is at $132^{nd}$ Ave in 0.5 miles, the map navigation tool reads out: "<variable> In 0.5 miles </variable> <static> Turn right onto 132nd Ave </static>." The order that the static and variable parts are read out can be switched. The static part is provided by the server or otherwise made part of the list of directions. The variable part is updated depending on current location.

If the user taps again, and the upcoming list item has not yet changed, the map navigation tool repeats the instruction for the upcoming list item, this time using the updated distance. If the upcoming list item has changed (e.g., depending on the current location after successful completion of an instruction), responsive to a subsequent tap gesture, the map navigation tool updates the upcoming list item to be a later list item and snaps to that list item in the display. The map navigation tool updates the map portion of the list view, if appropriate, using a plain horizontal animation or dynamic zoom. To prompt the user for the subsequent tap gesture, the map navigation tool can provide an audio cue when the user successfully completes an instruction. The icon and text for the next list item may also be visible after the upcoming list item in the list control.

The list view (402) in FIG. 4b shows a future list item (list item 6) at the top of the list control. The map navigation tool renders the list view (402) when the map navigation tool receives a flick up event. Responsive to a flick up gesture, the map navigation tool scrolls a few items forward in the list of directions, stopping at a list item that snaps to the top of the list control portion of the list view (402). This generally matches the behavior of other features of the user interface of the computing device responsive to a flick up gesture. The map navigation tool can also render the list view (402) responsive to a pan gesture, panning up in the list of directions, but in this case the map navigation tool does not necessarily stop at a list item that snaps to the tops of the list control portion.

In the list view (402) in FIG. 4b, the waypoint icon (433), main text detail "1060 NE $93^{rd}$ Street," direction icon (444), etc. for future list item 6 are displayed at the top of the list control portion. The current location icon (421) is not displayed in FIG. 4b, but can be displayed in some cases. In the map portion of the list view (402), the map navigation tool updates the display to show the waypoint icon (433) for future list item 6. In the map portion, the orientation of the map is north facing up, and the user is able to interact with the map using pan, double tap, pinch, or spread gestures. In general, the map navigation tool does not use audio prompts for future list items.

The list view (403) in FIG. 4c shows a previous list item (list item 1) in the list control. The map navigation tool renders the list view (403) when the map navigation tool receives a flick down event. Responsive to a flick down gesture, the map navigation tool scrolls a few items back in the list of directions, stopping at a list item (or start text) that snaps to the top of the list control portion of the list view (403). This generally matches the behavior of other features of the user interface of the computing device responsive to a flick down gesture. The map navigation tool can also render the list view (403) responsive to a pan gesture, panning down in the list of directions, but in this case the map navigation tool does not necessarily stop at a list item (or start text) that snaps to the tops of the list control portion.

In the list view (403) in FIG. 4c, the waypoint icon (434), main text detail "148$^{th}$ Avenue NE," direction icon (444), etc. for previous list item 1 are displayed in the list control portion. The current location icon (421) is not displayed in FIG. 4c, but can be displayed in some cases. In the map portion of the list view (403), the map navigation tool updates the display to show the waypoint icon (434) for previous list item 1. In the map portion, the orientation of the map is north facing up, and the user is able to interact with the map using pan, double tap, pinch, or spread gestures. In general, the map navigation tool does not use audio prompts for previous list items.

From the list view (402) in FIG. 4b or list view (403) in FIG. 4c, if the map navigation tool receives a tap user input event, the map navigation tool transitions to a list view such as the list view (401) shown in FIG. 4a, with emphasis on the upcoming list item. The map navigation tool updates the distance value between the current location and location for the upcoming list item, if appropriate, and updates the map portion to display the current location icon and waypoint icon for the upcoming list item, using dynamic zoom if appropriate.

Alternatively, for user-driven navigation, the map navigation tool reacts to different types of user input (e.g., tap, flick up gesture, flick down gesture, or pan gesture on a touchscreen) in other ways. For example, the map navigation tool reacts to tap input by outputting an indication of the current list item, whether the current list item is the upcoming list item, a future list item, or a previous list item.

Changing Emphasis of List Items Depending on Current Location

According to a second set of innovations described herein, a map navigation tool dynamically adjusts presentation of graphics and text for instructions depending on the current location of the computing device. In particular, the map navigation tool emphasizes the upcoming instruction relative to future instructions and previous instructions. This can help the user grasp complex route information more easily, especially if a user quickly scrolls through the list or glances at the map navigation UI. For example, the map navigation UI can use different color schemes for upcoming, future and previous list items in a list of directions. This allows the user to more quickly understand where the current location fits in the list of directions for the route. As another example, when an instruction has been successfully completed for a list item, the map navigation UI can use an audio and/or graphical indication to prompt the user for input to move to the next list item.

FIG. 7 shows a generalized technique (700) for rendering list items with different color schemes in a map navigation tool. A computing device such as a mobile computing device can perform the technique (700).

To start, the map navigation tool identifies (710) an upcoming list item among multiple list items of a list of directions for a route. The map navigation tool then renders for display a view of at least part of the list of directions. The way the graphics and/or text for a given list item are rendered can depend on whether the list item is the upcoming list item, a future list item that follows the upcoming list item in the order of the list of directions, or a previous list item that precedes the upcoming list item in the order.

For a given list item, the map navigation tool checks (720) whether the given list item is the upcoming list item and, if so, renders (730) the given list item according to a first color scheme. Otherwise, the map navigation tool checks (740) whether the given list item is a future list item and, if so, renders (750) the future list item according to a second color scheme different than the first color scheme. Otherwise, the given list item is a previous list item, and the map navigation tool renders (760) the previous list item in a third color scheme different than the first and second color schemes. The tool then checks (790) whether to continue with another list item and, if so, continues to render the other list item in the view.

For example, if the given list item is the upcoming list item, according to the first color scheme, the upcoming list item is emphasized by rendering the waypoint icon, the direction icon and/or the location text for the upcoming list item in an accent color (e.g., green, red). In FIG. 4a, the waypoint icon (431), direction icon (441) and distance value (451) for upcoming list item 2 are shown in the accent color (dark gray in FIG. 4a, due to limitations on reproduction of color drawings). Otherwise, if the given list item is a future list item, according to the second color scheme, the future list item is shown by rendering the waypoint icon, the direction icon and/or the location text for the future list item with a default color (e.g., black) different than the accent color. In FIGS. 4a and 4b, the waypoint icons (432, 433), direction icons (442, 443), location text and distance values (452, 453) for future list items 3 and 6 are shown in black to mark these as future instructions. Otherwise, if the given list item is a previous list item, according to the third color scheme, the previous list item is de-emphasized by rendering the waypoint icon, the direction icon and/or the location text for the previous list item with lower intensity (e.g., as gray) than the default color and the accent color. In FIG. 4c, the waypoint icons (434, 435), direction icons (444) and location text for previous list items 1 and 2 are shown in gray to mark these as past instructions. Alternatively, the map navigation tool implements the three color schemes in a different way.

Similarly, the way distance values are rendered can depend on whether the list item is the upcoming list item, a future list item or a previous list item. For example, if the given list item is the upcoming list item, a distance value between a current location of the computing device and the location for the upcoming list item is rendered in the view of at least part of the list of directions. If the given list item is a future list item, a distance value between the location for the future list item and previous location is rendered in the view of at least part of the list of directions. If the given list item is a previous list item, no distance value is rendered for the given list item.

Figure 8:
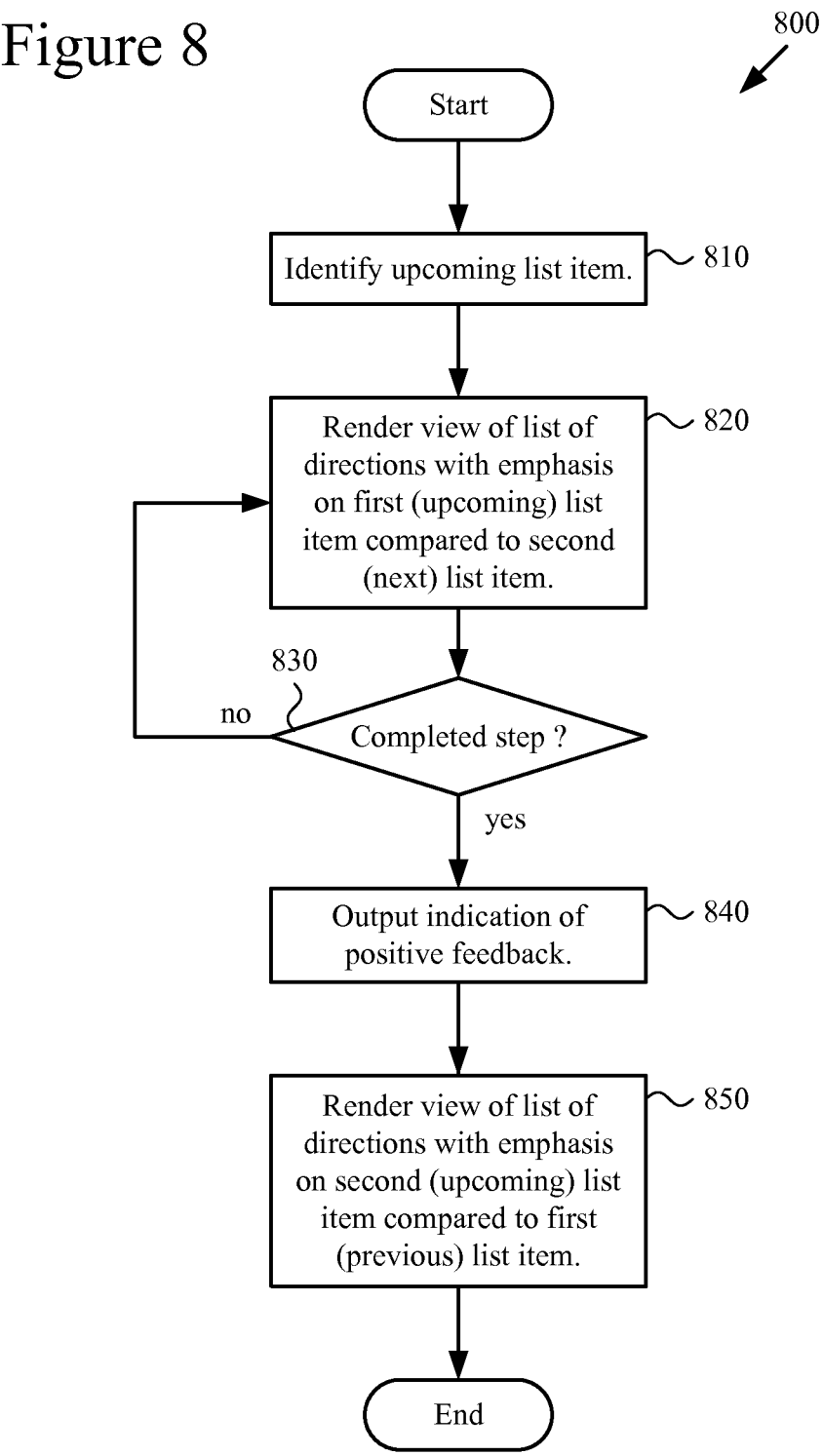
FIG. 8 is a flowchart illustrating a generalized technique for rendering list views in a map navigation tool depending on status of the list items.

FIG. 8 shows a generalized technique for rendering list views in a map navigation tool depending on status of the list items during navigation. A computing device such as a mobile computing device can perform the technique (800).

The map navigation tool identifies (810) an upcoming list item among multiple list items of a list of directions for a route. The map navigation tool then renders (820) for display a first view of at least part of the list of directions. In doing so, a first list item of the multiple list items is emphasized in the first view, as the upcoming list item, compared to a second list item that follows the first list item in the order of the list of directions. For example, a graphical icon and/or text for the first list item (upcoming) are rendered in an accent color, while a graphical icon and/or text for the second list item (future) are rendered with lower intensity or a different color. The first list item can be the initial list item in the list of directions or another list item at the top of the list control portion of the list view.

The map navigation tool checks (830) whether navigation has successfully completed for the upcoming list item. If so, responsive to successful the completion of navigation for the upcoming list item, the map navigation tool outputs (840) an indication of positive feedback (e.g., beep, ding or other audible tone), changes the upcoming list item to be the second list item (next in the list of directions), and renders (850) for display a second view of at least part of the list of directions. In the second view, the first list item is de-emphasized compared to the first view, and the second list item (as the upcoming list item) is emphasized compared to the first list item. For example, in the second view, the graphical icon and/or text for the second list item (now upcoming) are rendered in the accent color, while the graphical icon and/or text for the first list item (now previous) are rendered with lower intensity or a different color. Alternatively, the map navigation tool emphasizes and/or de-emphasizes list items in a different way.

When used in combination with user-driven navigation, the map navigation tool can render the first view responsive to a first user input event (e.g., for a tap gesture). After the successful completion of navigation for the first list item and rendering of the second view, when the map navigation tool receives another user input event (e.g., for a tap gesture), responsive to the other user input event, the map navigation tool renders for display a third view of at least part of the list of directions. (When navigation for the first list item is successfully completed, the map navigation tool can output an indication of positive feedback to prompt the user for subsequent user input.) In the third view, the second list item (as the upcoming list item) is further emphasized by aligning text for the second list item at the top of the list control portion for a snap effect. Responsive to the user input events, the first view and third view can be accompanied by voice output for text description for the first list item and second list item, respectively.

Figure 9A:
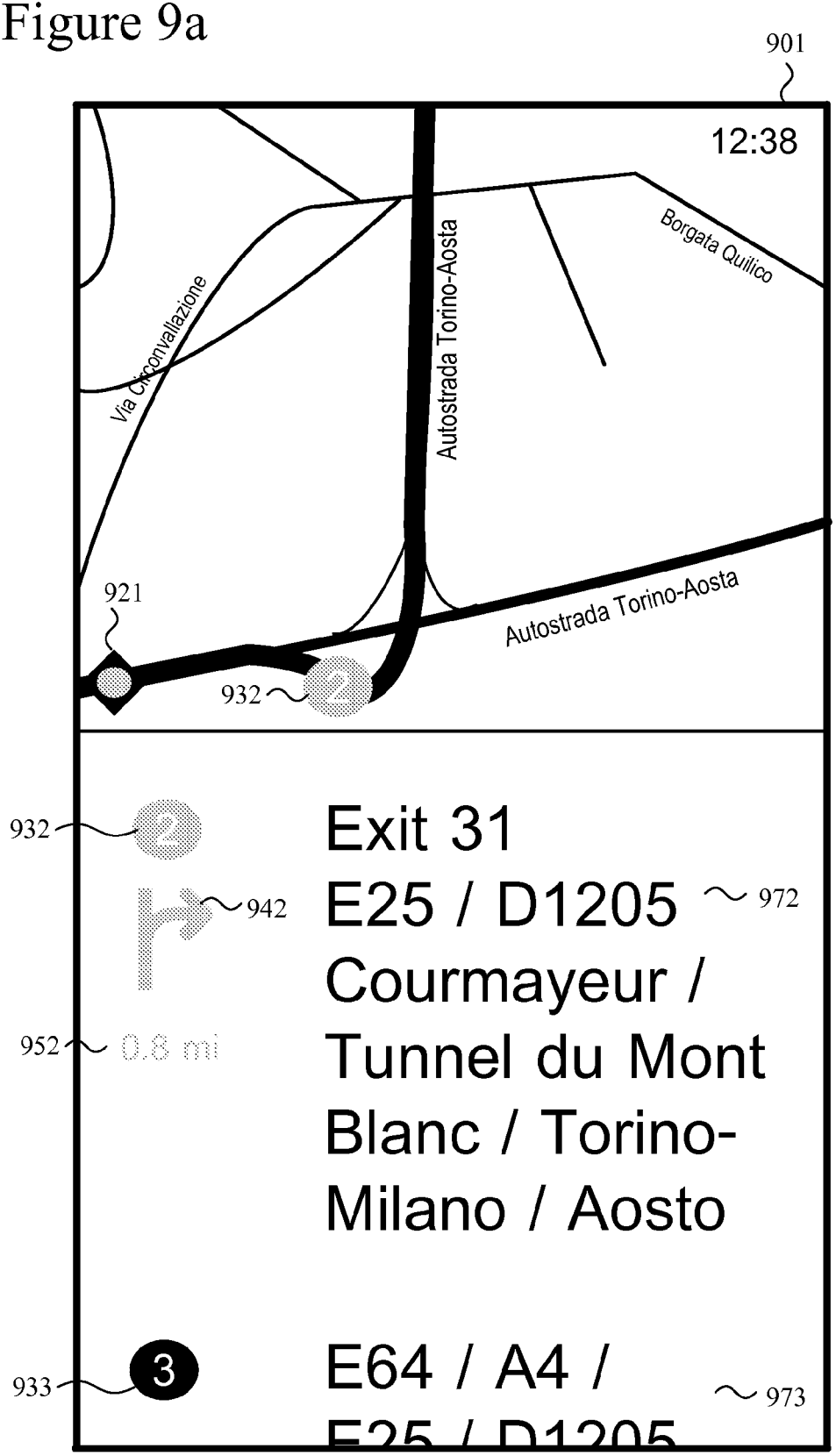
FIGS. 9a and 9b are diagrams illustrating changes to a list view depending on status of the list items.
Figure 9B:
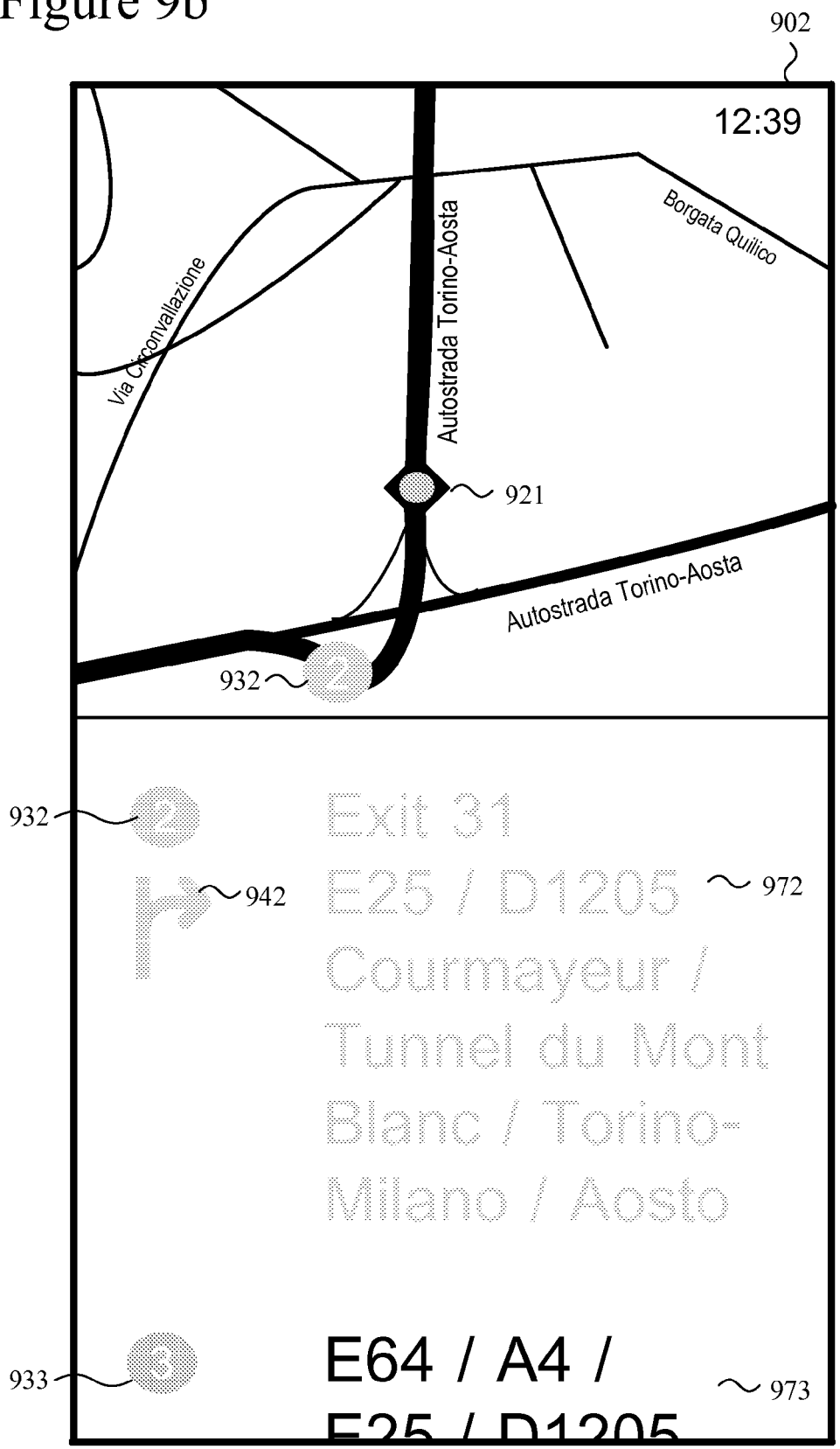

FIGS. 9a and 9b show list views (901, 902) that change depending on status of the list items. In the list view (901) in FIG. 9a, list item 2 is the upcoming list item, and list item 3 is a future list item. The map portion shows a current location icon (921) that is updated as the current location approaches the location for list item 2, which is shown using the waypoint icon (932) in the map portion. In the list control portion, the waypoint icon (932), direction icon (942) and distance value (952) for list item 2 are rendered in an accent color, but the main text (972) is shown in the default color for better readability. The waypoint icon (933) and main text (973) for list item 3 (future list item) are rendered in the default color.

Between FIGS. 9a and 9b, the user successfully completes the navigation for list item 2. The map navigation tool can output an audible tone to prompt the user to provide user input, so as to cause the map navigation tool to update the upcoming list item to be list item 3. The map navigation tool can also change the list view to show that list item 2 is now "stale," which provides a visual prompt to the user to provide user input. In the list view (902) in FIG. 9b, the current location icon (921) has changed positions in the map portion, list item 2 is rendered as a previous list item, and list item 3 is rendered as the upcoming list item. In the map portion, the waypoint icon (932) for list item 2 is rendered in gray. In the list control portion, the waypoint icon (932), direction icon (942) and text (972) for list item 2 (now previous) are grayed out, and the waypoint icon (933) for list item 3 (now upcoming) is rendered in the accent color.

Adjustable Destination Icon

On arriving at the end location of a route, a user often overshoots the destination or spends some time wondering which side of a road is closer to the destination. According to a third set of innovations described herein, a map navigation tool uses a destination icon that directs the user towards the destination of a route when the user is close to and/or past the destination. For example, the map navigation tool adds a graphic icon to the final list item which indicates the direction to the destination of the route. This provides additional guidance to the user at the end of the route. In addition, if the user passes by the destination, or the current location otherwise changes relative to the destination, the map navigation tool can rotate, change or otherwise alter the destination icon to indicate the direction of the destination. Thus, a user can quickly check the map navigation UI to determine the destination is behind, to the left, to the right, or in front of the user.

Figure 10:
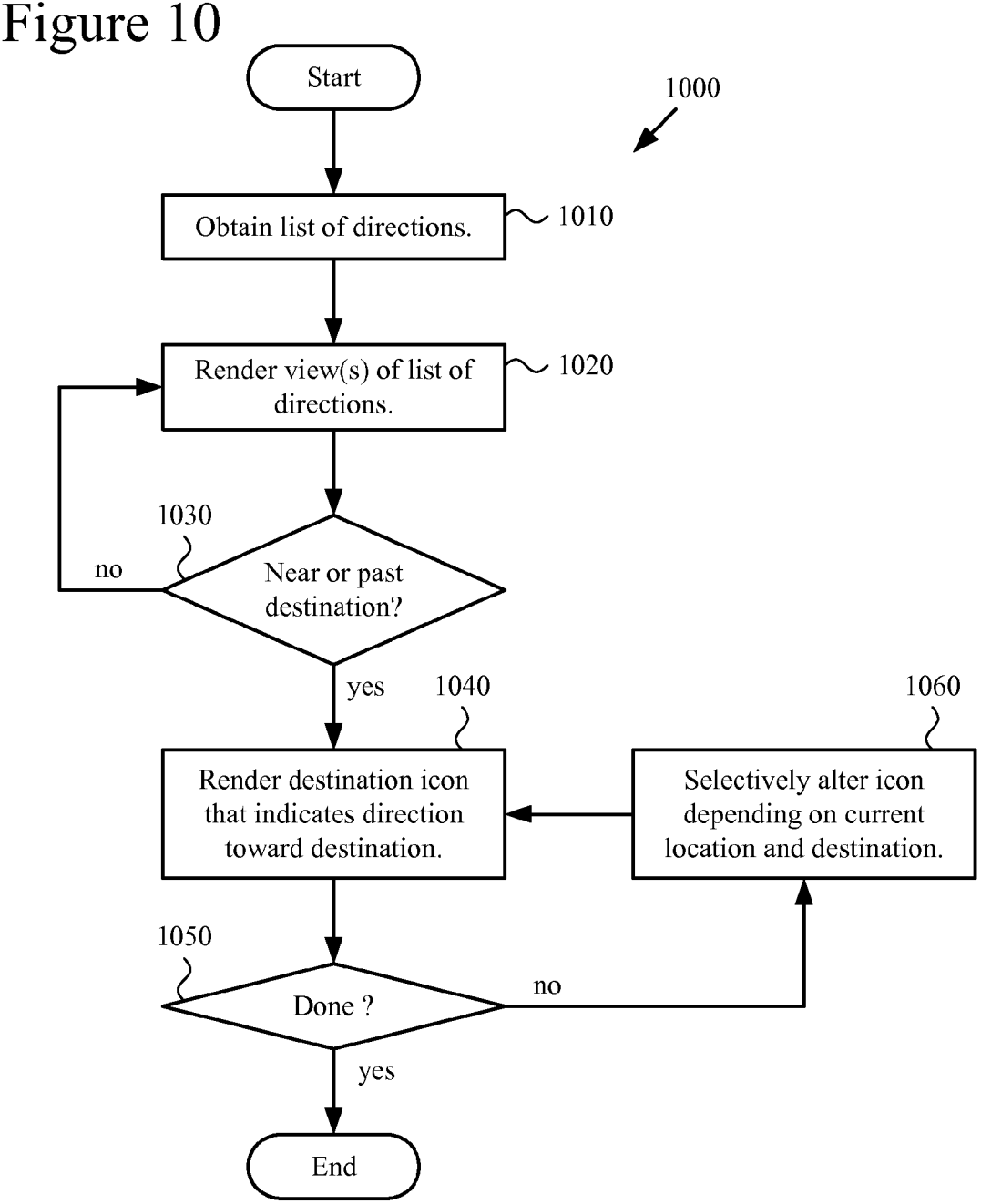
FIG. 10 is a flowchart illustrating a generalized technique for rendering a graphical icon that indicates direction toward an end location of a route.

FIG. 10 shows a generalized technique (1000) for rendering a graphical icon that indicates direction toward a destination of a route with a map navigation tool. A computing device such as a mobile computing device can perform the technique (1000).

To start, the map navigation tool obtains (1010) a list of directions for a route. The map navigation tool renders (1020) one or more views of the list of directions. For example, for multiple list items of the list of the directions, the map navigation tool renders waypoint icons, direction icons and/or text for the respective list items in list views.

The map navigation tool checks (1030) whether the computing device is near the destination or past the destination, which may be an end location apart from the list of directions or location for the final list item as the end location. For example, the map navigation tool checks the current location of the computing device relative to the route mapping and the end location. If the current location is outside a threshold distance from the destination, and the current location has not passed the destination, the map navigation tool continues rendering (1020) views of the list of directions. The threshold distance depends on implementation (e.g., 100 feet, 50 feet). If the map navigation tool determines that the current location is within the threshold distance from the end location, or determines the destination has been passed, the map navigation tool renders (1040) for display a destination icon that indicates direction towards an end location of the route. Alternatively, the map navigation tool only checks (1030) whether the current location is past the destination (and does not consider threshold distance from the destination), or the map navigation tool checks some other proximity condition. The rendering of the destination icon can be automatic (e.g., when the destination is passed, or when the current location is close enough to the destination), or the rendering of the destination icon can be user-driven (e.g., responsive to user input such as a tap gesture when proximity condition(s) are satisfied).

The map navigation tool checks (1050) whether map navigation has completed (e.g., by the user closing the map navigation UI). If not, the map navigation tool selectively alters (1060) the destination icon depending on current location and end location, then renders (1040) the destination icon again. For example, the map navigation tool alters the destination icon by rotating the icon towards the end location, by switching between multiple icons (e.g., representing left, right, ahead and behind directions, respectively) or in some other way. The map navigation tool can alter the destination icon in one or more iterations after the destination icon is initially rendered. The selective alteration of the destination icon depending on the current location and end location can be automatic (e.g., every 1 second as the current location is updated), or the selective alteration of the destination icon can be user-driven (e.g., responsive to user input such as a tap gesture to update the destination icon).

Figure 11A:
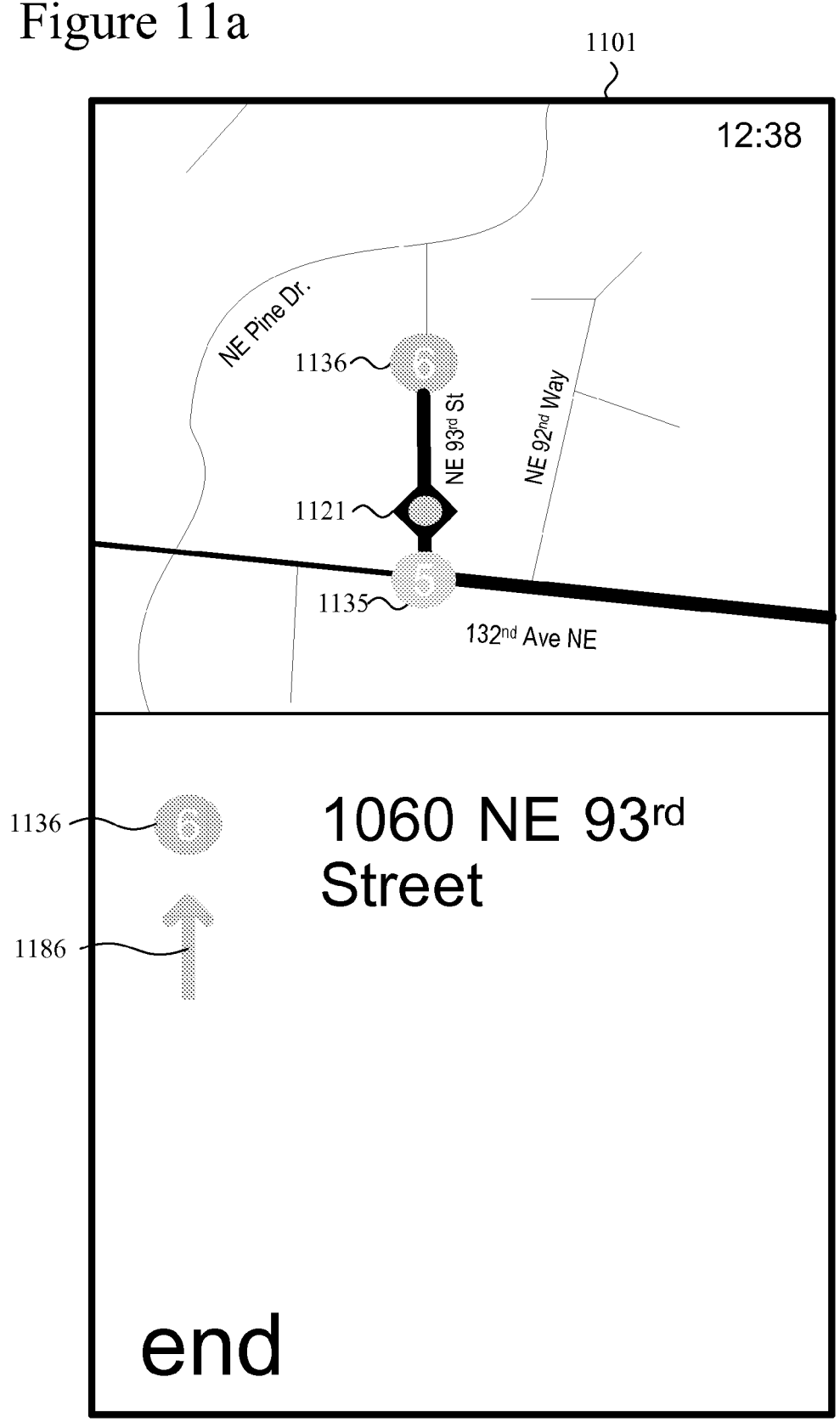
FIGS. 11a-11d are diagrams illustrating destination icons that indicate direction toward an end location of a route.
Figure 11B:
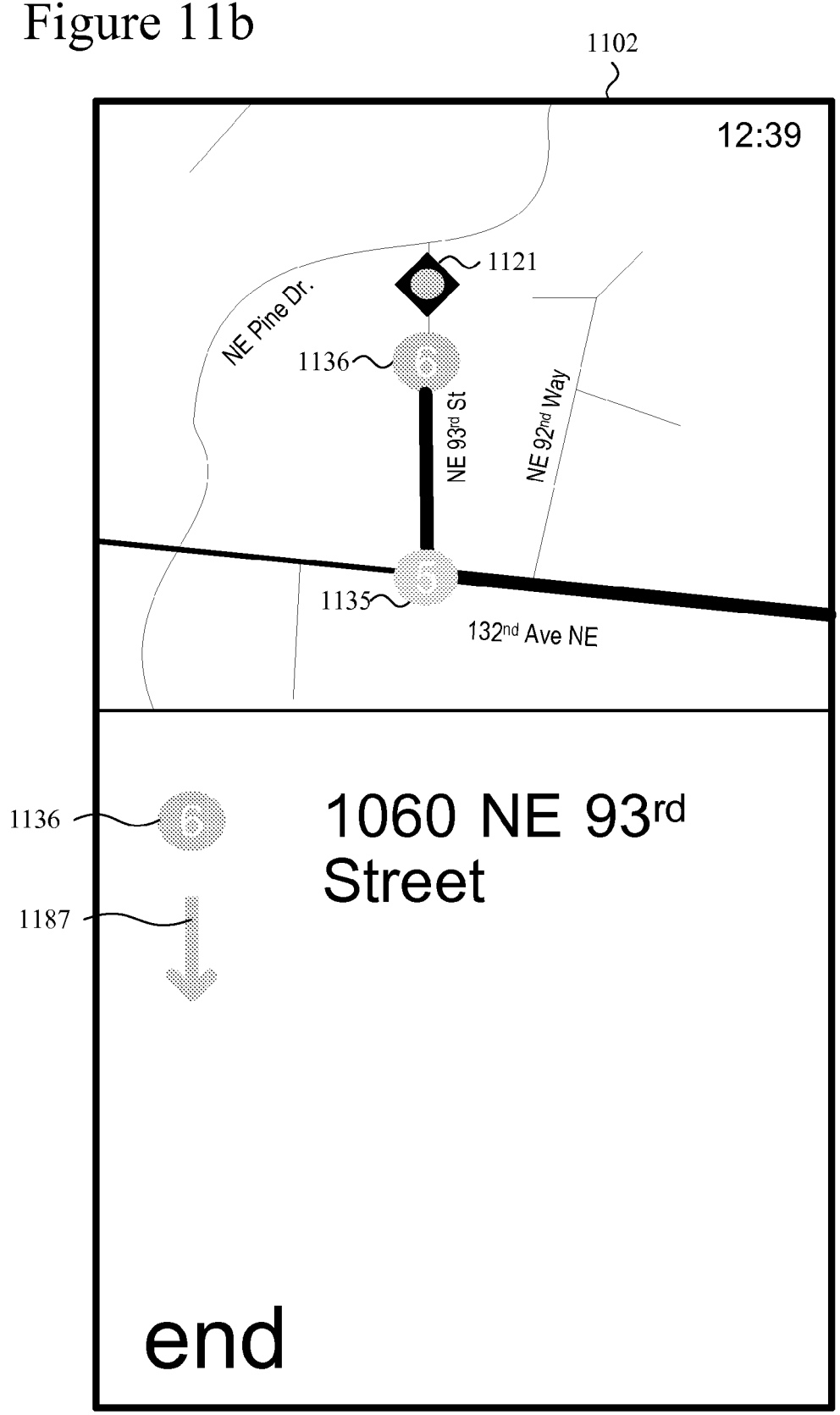

FIGS. 11a-11d show example destination icons in a list view rendered using a map navigation tool. The destination icon can be a simple arrow icon that points to the destination. In FIG. 11a, the destination icon (1186) is a simple arrow that indicates the direction toward the end location (for list item 6). In this case, the destination icon (1186) resembles a direction icon, in that it indicates the course of travel along the final part of the route. The arrow icon rotates towards the destination, however, depending on the current location. In FIG. 11b, the destination icon (1187) has been rotated, considering the change in current location of the computing device relative to the end location. This also alerts the user that the destination has been passed.

Figure 11C:
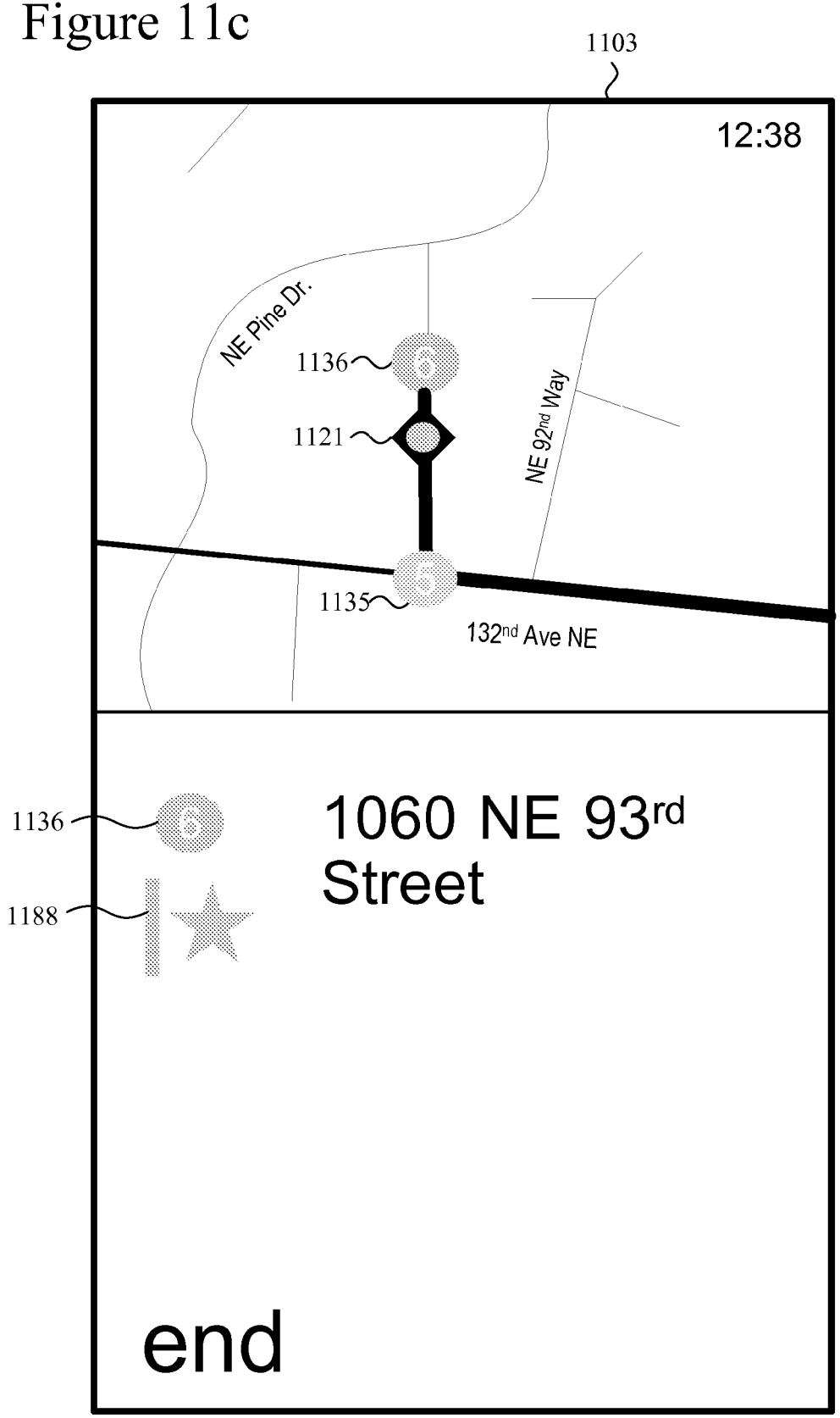
Figure 11D:
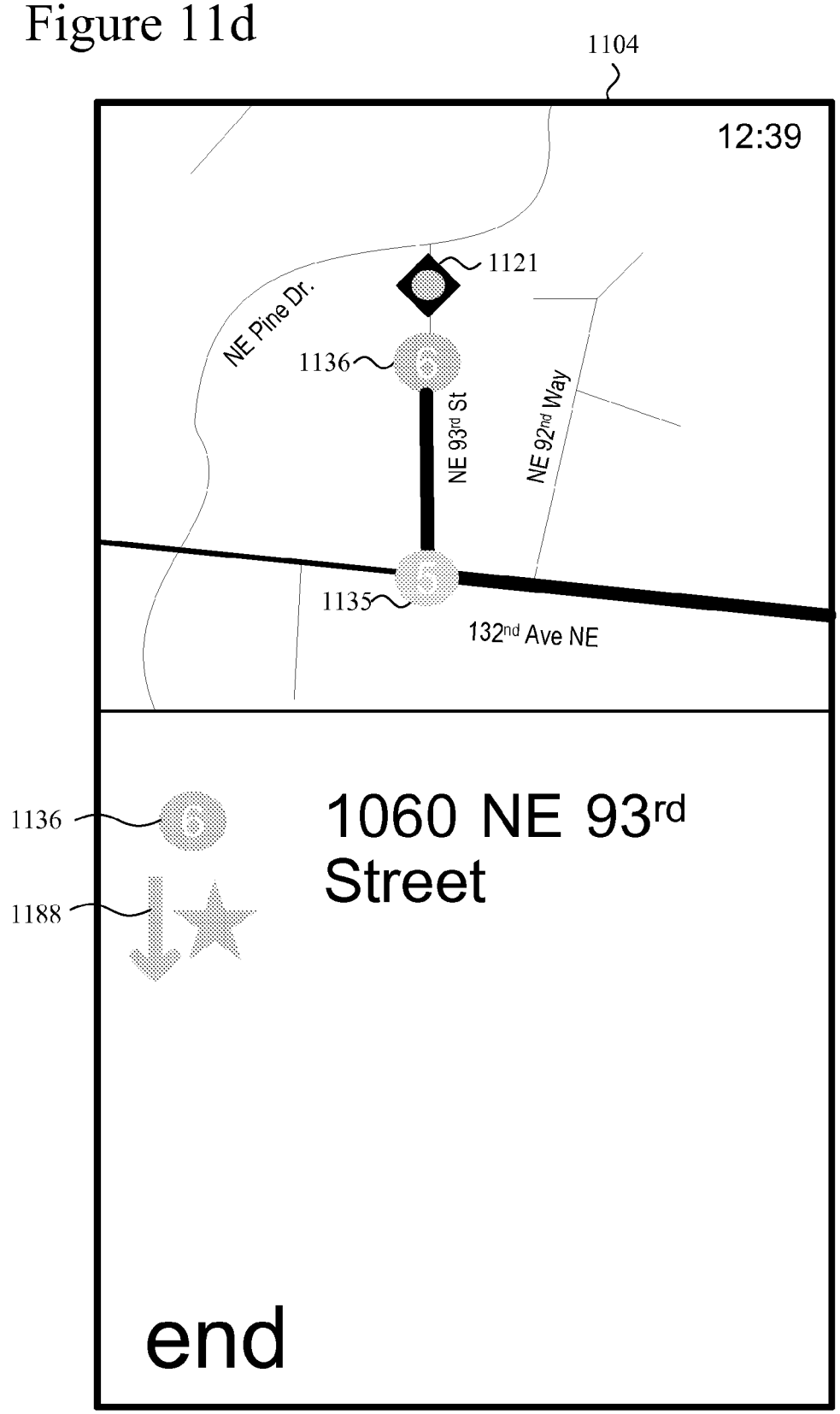

Alternatively, the destination icon can be another shape or pattern. In FIG. 11c, for example, the destination icon (1188) has a star and road pattern. The position of the star relative to the road indicates the side of the road on which the destination is located. In FIG. 11d, the destination icon (1189) is a star and arrow pattern, which indicates the user should turn around and also indicates the side of the road on which the destination is located. Alternatively, the map navigation tool uses a simple star icon to mark the destination when the current location is sufficiently close (e.g., within a threshold distance) of the end location or past the end location, and that simple star icon does not rotate, or the map navigation tool uses another shape or pattern for the destination icon.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. In FIGS. 6b and 7, for example, the order in which types of user input events are checked, types of list items are checked, which list items are checked, etc. can be rearranged. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a map navigation tool, a method comprising:

with the computing device that implements the map navigation tool, identifying an upcoming list item among multiple list items of a list of directions for a route, the list of directions including the multiple list items in an order;

with the computing device that implements the map navigation tool, receiving a user input event;

with the computing device that implements the map navigation tool, responsive to the user input event, outputting an indication of the upcoming list item;

with the computing device that implements the map navigation tool, based at least in part on a change to current location of the computing device, changing the upcoming list item; and with the computing device that implements the map navigation tool, delaying outputting an indication of the changed upcoming list item until receipt of a subsequent user input event.

2. The method of claim 1 further comprising, before the changing of the upcoming list item from the earlier identified list item, for each of one or more other user input events:

with the computing device that implements the map navigation tool, receiving the other user input event; and with the computing device that implements the map navigation tool, responsive to the other user input event, outputting the indication of the earlier identified upcoming list item, thereby repeating the output of the indication of the earlier identified upcoming list item.

3. The method of claim 1 further comprising:
- with the computing device that implements the map navigation tool, receiving the subsequent user input event; and
- with the computing device that implements the map navigation tool, responsive to the subsequent user input event, outputting the indication of the changed upcoming list item, thereby advancing in the order through the multiple list items.

4. The method of claim 1 wherein the user input event represents a tap on a touchscreen of the computing device, voice input to a microphone of the computing device, or button or keystroke input to the computing device.

5. The method of claim 1 wherein the outputting the indication of the upcoming list item comprises:
- rendering for display a view of at least part of the list of directions, wherein the upcoming list item is emphasized in the view compared to other list items of the multiple list items.

6. The method of claim 5 wherein the upcoming list item is emphasized in the view by rendering a graphical icon and/or text for the upcoming list item in an accent color different than a default color used to render other list items of the multiple list items.

7. The method of claim 5 wherein the upcoming list item is emphasized in the view by aligning text for the upcoming list item at the top of a list control portion of the view.

8. The method of claim 1 wherein the outputting the indication of the upcoming list item comprises:
- rendering for audio playback voice output for text description of the upcoming list item.

9. The method of claim 1 wherein the outputting the indication of the upcoming list item comprises rendering for display a first view of at least part of the list of directions, the method further comprising:
- with the computing device that implements the map navigation tool, receiving another user input event; and
- with the computing device that implements the map navigation tool, responsive to the other user input event, rendering for display a second view of at least part of the list of directions that is scrolled relative to the first view.

10. The method of claim 9 wherein the other user input event represents a flick gesture or pan gesture on a touchscreen of the computing device.

11. The method of claim 9 further comprising identifying a future list item among the multiple list items, the future list item following the upcoming list item in the order, wherein the future list item is shown in the second view by rendering a graphical icon and/or text for the future list item with a default color different than an accent color used to render a graphical icon and/or text for the upcoming list item.

12. The method of claim 11 further comprising identifying a previous list item among the multiple list items, the previous list item preceding the upcoming list item in the order, wherein the previous list item is de-emphasized in the second view by rendering a graphical icon and/or text for the previous list item with lower intensity than the default color and the accent color.

13. The method of claim 1 further comprising:
- with the computing device that implements the map navigation tool, checking whether a current list item is the upcoming list item;
- if the current list item is the upcoming list item, with the computing device that implements the map navigation tool, setting orientation of a view of a map so that heading toward an end location of the route is upward in the view of the map; and
- otherwise, if the current list item is not the upcoming list item, with the computing device that implements the map navigation tool, setting the orientation of the view of the map so that north is upward in the view of the map.

14. The method of claim 1 wherein the identification of the upcoming list item is based at least in part on current location of the computing device, the method further comprising:
- upon successful completion of navigation for the upcoming list item, with the computing device that implements the map navigation tool, outputting an indication of positive feedback; and
- upon deviation from the route, with the computing device that implements the map navigation tool, outputting an indication of negative feedback.

15. A computing device that includes a processor and memory, the computing device being adapted to perform a method comprising:
- identifying an upcoming list item among multiple list items of a list of directions for a route, the list of directions including the multiple list items in an order;
- receiving a user input event, wherein the user input event represents a tap on a touchscreen of the computing device, voice input to a microphone of the computing device, or button or keystroke input to the computing device;
- responsive to the user input event, outputting an indication of the upcoming list item, wherein the outputting comprises:
  - rendering for display a view of at least part of the list of directions; and
  - rendering for audio playback voice output for text description of the upcoming list Item;
- based at least in part on a change to current location of the computing device, changing the upcoming list item; and
- delaying outputting an indication of the changed upcoming list item until receipt of a subsequent user input event.

16. The computing device of claim 15 wherein the method further comprises, before the changing of the upcoming list item, for each of one or more other user input events:
- receiving the other user input event; and
- responsive to the other user input event, outputting the indication of the earlier identified upcoming list item, thereby repeating the output of the indication of the earlier identified upcoming list item.

17. The computing device of claim 15 wherein the method further comprises:
- receiving the subsequent user input event; and
- responsive to the subsequent user input event, outputting the indication of the changed upcoming list item, thereby advancing in the order through the multiple list items.

18. The computing device of claim 15 wherein the upcoming list item is emphasized in the view compared to other list items of the multiple list items by (a) rendering a graphical icon and/or text for the upcoming list item in an accent color different than a default color used to render other list items of the multiple list items and (b) by aligning the text for the upcoming list item at the top of a list control portion of the view.

19. The computing device of claim 15 wherein the method further comprises:
- upon successful completion of navigation for the upcoming list item, outputting an indication of positive feedback; and
- upon deviation from the route, outputting an indication of negative feedback.

20. A storage device storing computer-executable instructions for causing a computing device to perform a method, the storage device being selected from the group consisting of volatile memory, non-volatile memory and optical disk media, the method comprising:
- identifying an upcoming list item among multiple list items of a list of directions for a route, the list of directions including the multiple list items in an order;
- receiving a user input event, wherein the user input event represents a tap on a touchscreen of the computing device, voice input to a microphone of the computing device, or button or keystroke input to the computing device;
- responsive to the user input event, outputting an indication of the upcoming list item, wherein the outputting comprises rendering for display a first view of at least part of the list of directions;
- receiving a subsequent user input event, wherein the subsequent user input event represents a flick gesture or pan gesture on a touchscreen of the computing device; and
- responsive to the subsequent user input event, rendering for display a second view of at least part of the list of directions that is scrolled relative to the first view.

21. A storage device storing computer-executable instructions for causing a computing device that implements a map navigation tool to perform a method, the storage device being selected from the group consisting of volatile memory, non-volatile memory and optical disk media, the method comprising: with the computing device that implements the map navigation tool, identifying an upcoming list item among multiple list items of a list of directions for a route, the list of directions including the multiple list items in an order; with the computing device that implements the map navigation tool, receiving a user input event; with the computing device that implements the map navigation tool, responsive to the user input event, outputting an indication of the upcoming list item; with the computing device that implements the map navigation tool, based at least in part on a change to current location of the computing device, changing the upcoming list item; and with the computing device that implements the map navigation tool, delaying outputting an indication of the changed upcoming list item until receipt of a subsequent user input event.

22. The storage device of claim 21 wherein the method further comprises, before the changing of the upcoming list item from the earlier identified list item, for each of one or more other user input events: with the computing device that implements the map navigation tool, receiving the other user input event; and with the computing device that implements the map navigation tool, responsive to the other user input event, outputting the indication of the earlier identified upcoming list item, thereby repeating the output of the indication of the earlier identified upcoming list item.

23. The storage device of claim 21 wherein the method further comprises: with the computing device that implements the map navigation tool, receiving the subsequent user input event; and with the computing device that implements the map navigation tool, responsive to the subsequent user input event, outputting the indication of the changed upcoming list item, thereby advancing in the order through the multiple list items.

24. The storage device of claim 21 wherein the outputting the indication of the upcoming list item comprises: rendering for display a view of at least part of the list of directions, wherein the upcoming list item is emphasized in the view compared to other list items of the multiple list items.

25. The storage device of claim 21 wherein the outputting the indication of the upcoming list item comprises rendering for display a first view of at least part of the list of directions, and wherein the method further comprises: with the computing device that implements the map navigation tool, receiving another user input event; and with the computing device that implements the map navigation tool, responsive to the other user input event, rendering for display a second view of at least part of the list of directions that is scrolled relative to the first view.

26. The storage device of claim 21 wherein the method further comprises: with the computing device that implements the map navigation tool, checking whether a current list item is the upcoming list item; if the current list item is the upcoming list item, with the computing device that implements the map navigation tool, setting orientation of a view of a map so that heading toward an end location of the route is upward in the view of the map; and otherwise, if the current list item is not the upcoming list item, with the computing device that implements the map navigation tool, setting the orientation of the view of the map so that north is upward in the view of the map.

27. The storage device of claim 21 wherein the identification of the upcoming list item is based at least in part on current location of the computing device, and wherein the method further comprises: upon successful completion of navigation for the upcoming list item, with the computing device that implements the map navigation tool, outputting an indication of positive feedback; and upon deviation from the route, with the computing device that implements the map navigation tool, outputting an indication of negative feedback.

28. In a computing device that implements a map navigation tool, a method comprising:
- with the computing device that implements the map navigation tool, identifying an upcoming list item among multiple list items of a list of directions for a route, the list of directions including the multiple list items in an order;
- with the computing device that implements the map navigation tool, receiving a user input event, wherein the user input event represents a tap on a touchscreen of the computing device, voice input to a microphone of the computing device, or button or keystroke input to the computing device;
- with the computing device that implements the map navigation tool, responsive to the user input event, outputting an indication of the upcoming list item, wherein the outputting comprises rendering for display a first view of at least part of the list of directions;
- with the computing device that implements the map navigation tool, receiving a subsequent user input event, wherein the subsequent user input event represents a flick gesture or pan gesture on a touchscreen of the computing device; and
- with the computing device that implements the map navigation tool, responsive to the subsequent user input event, rendering for display a second view of at least part of the list of directions that is scrolled relative to the first view.

29. The method of claim 28 wherein the upcoming list item is emphasized in the first view compared to other list items of the multiple list items.

30. The method of claim 29 wherein the upcoming list item is emphasized in the first view by rendering a graphical icon and/or text for the upcoming list item in an accent color different than a default color used to render other list items of the multiple list items.

31. The method of claim 29 wherein the upcoming list item is emphasized in the first view by aligning text for the upcoming list item at the top of a list control portion of the view.

32. The method of claim 28 further comprising identifying a future list item among the multiple list items, the future list item following the upcoming list item in the order, wherein the future list item is shown in the second view by rendering a graphical icon and/or text for the future list item with a default color different than an accent color used to render a graphical icon and/or text for the upcoming list item.

33. The method of claim 32 further comprising identifying a previous list item among the multiple list items, the previous list item preceding the upcoming list item in the order, wherein the previous list item is de-emphasized in the second view by rendering a graphical icon and/or text for the previous list item with lower intensity than the default color and the accent color.

34. A computing device that includes a processor and memory, the computing device being adapted to perform a method comprising:
  identifying an upcoming list item among multiple list items of a list of directions for a route, the list of directions including the multiple list items in an order;
  receiving a user input event, wherein the user input event represents a tap on a touchscreen of the computing device, voice input to a microphone of the computing device, or button or keystroke input to the computing device;
  responsive to the user input event, outputting an indication of the upcoming list item, wherein the outputting comprises rendering for display a first view of at least part of the list of directions;
  receiving a subsequent user input event, wherein the subsequent user input event represents a flick gesture or pan gesture on a touchscreen of the computing device; and
  responsive to the subsequent user input event, rendering for display a second view of at least part of the list of directions that is scrolled relative to the first view.

35. The method of claim 34 wherein the upcoming list item is emphasized in the first view compared to other list items of the multiple list items.

36. The method of claim 35 wherein the upcoming list item is emphasized in the first view by rendering a graphical icon and/or text for the upcoming list item in an accent color different than a default color used to render other list items of the multiple list items.

37. The method of claim 35 wherein the upcoming list item is emphasized in the first view by aligning text for the upcoming list item at the top of a list control portion of the view.

38. The method of claim 34 further comprising identifying a future list item among the multiple list items, the future list item following the upcoming list item in the order, wherein the future list item is shown in the second view by rendering a graphical icon and/or text for the future list item with a default color different than an accent color used to render a graphical icon and/or text for the upcoming list item.

39. The method of claim 38 further comprising identifying a previous list item among the multiple list items, the previous list item preceding the upcoming list item in the order, wherein the previous list item is de-emphasized in the second view by rendering a graphical icon and/or text for the previous list item with lower intensity than the default color and the accent color.

* * * * *